(12) United States Patent
Matsumoto et al.

(10) Patent No.: US 8,545,001 B2
(45) Date of Patent: *Oct. 1, 2013

(54) INK COMPOSITION, INK SET AND IMAGE FORMING METHOD

(75) Inventors: Jun Matsumoto, Kanagawa (JP); Tomoyuki Ohzeki, Kanagawa (JP); Masao Ikoshi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 356 days.

This patent is subject to a terminal disclaimer.

(21) Appl. No.: 12/881,200

(22) Filed: Sep. 14, 2010

(65) Prior Publication Data

US 2011/0069112 A1    Mar. 24, 2011

(30) Foreign Application Priority Data

Sep. 18, 2009  (JP) ................................. 2009-217796

(51) Int. Cl.
*B41J 2/01* (2006.01)
(52) U.S. Cl.
USPC .......................................... 347/100; 347/95
(58) Field of Classification Search
USPC ............... 347/100, 95, 96, 101, 20, 21, 9, 88, 347/99, 105; 106/31.6, 31.13, 31.27; 523/160, 523/161
See application file for complete search history.

(56) References Cited

U.S. PATENT DOCUMENTS

| | | | |
|---|---|---|---|
| 4,256,493 A | 3/1981 | Yokoyama et al. | |
| 5,919,291 A | 7/1999 | Hotomi et al. | |
| 6,439,708 B1* | 8/2002 | Kato et al. | 347/98 |
| 2002/0001024 A1 | 1/2002 | Wouters et al. | |
| 2002/0149634 A1* | 10/2002 | Fujii et al. | 347/11 |
| 2004/0061747 A1 | 4/2004 | Nakao et al. | |
| 2005/0062815 A1 | 3/2005 | Yoshihira et al. | |
| 2005/0270349 A1 | 12/2005 | Sakasai | |
| 2007/0078200 A1 | 4/2007 | Yoshida | |
| 2007/0081062 A1 | 4/2007 | Higuchi et al. | |
| 2007/0149646 A1 | 6/2007 | Nagashima | |
| 2007/0216743 A1* | 9/2007 | Makuta et al. | 347/100 |
| 2009/0088521 A1* | 4/2009 | Hosokawa et al. | 524/558 |
| 2009/0202723 A1* | 8/2009 | Ikoshi et al. | 427/256 |
| 2009/0202724 A1* | 8/2009 | Arai et al. | 427/256 |
| 2009/0203833 A1* | 8/2009 | Sasada et al. | 524/558 |
| 2010/0053288 A1 | 3/2010 | Ohzeki et al. | |
| 2010/0075050 A1 | 3/2010 | Tojo et al. | |
| 2010/0091055 A1 | 4/2010 | Kawakami et al. | |
| 2010/0165020 A1 | 7/2010 | Tojo | |

(Continued)

FOREIGN PATENT DOCUMENTS

| | | |
|---|---|---|
| EP | 1022151 A1 | 7/2000 |
| EP | 1760122 A2 | 3/2007 |

(Continued)

OTHER PUBLICATIONS

Corresponding EPO Official communication.

*Primary Examiner* — Manish S Shah
(74) *Attorney, Agent, or Firm* — SOLARIS Intellectual Property Group, PLLC

(57) ABSTRACT

The invention provides an inkjet ink composition including a pigment and colloidal silica, the pigment being covered with a water-insoluble resin including a constituent unit having an acidic group, with which rub resistance of images formed and ink discharge reliability are excellent and deterioration of liquid repellency of an inkjet head member is suppressed.

25 Claims, 2 Drawing Sheets

(56) References Cited

U.S. PATENT DOCUMENTS

| | | |
|---|---|---|
| 2010/0166962 A1 | 7/2010 | Ohzeki |
| 2011/0057986 A1 | 3/2011 | Ikoshi et al. |
| 2011/0069110 A1 | 3/2011 | Matsumoto et al. |
| 2011/0069111 A1 | 3/2011 | Matsumoto et al. |
| 2011/0069116 A1 | 3/2011 | Ohzeki et al. |
| 2011/0069117 A1 | 3/2011 | Ohzeki et al. |
| 2011/0069118 A1 | 3/2011 | Ohzeki et al. |

FOREIGN PATENT DOCUMENTS

| | | |
|---|---|---|
| EP | 2058375 A2 | 5/2009 |
| EP | 2090627 A | 8/2009 |
| EP | 2218757 A1 | 8/2010 |
| JP | 9-227812 A | 9/1997 |
| JP | 9-272826 A | 10/1997 |
| JP | 9-286941 A | 11/1997 |
| JP | 10-140065 A | 5/1998 |
| JP | 10-168373 A | 6/1998 |
| JP | 11-10856 A | 1/1999 |
| JP | 11-12516 A | 1/1999 |
| JP | 11-115303 A | 4/1999 |
| JP | 2001-329199 A | 11/2001 |
| JP | 2003-103897 A | 4/2003 |
| JP | 2003-165936 A | 6/2003 |
| JP | 3550637 B2 | 8/2004 |
| JP | 2005-23102 A | 1/2005 |
| JP | 2005-41994 A | 2/2005 |
| JP | 2005-105161 A | 4/2005 |
| JP | 2007-119683 A | 5/2007 |
| JP | 2007-152873 A | 6/2007 |
| JP | 2007-326231 A | 12/2007 |
| JP | 2008-6809 A | 1/2008 |
| JP | 2008-198642 A | 8/2008 |
| JP | 2008-260139 A | 10/2008 |
| JP | 2009-51990 A | 3/2009 |
| JP | 2009-190379 A | 8/2009 |
| JP | 2009-191134 A | 8/2009 |
| JP | 2009-196184 A | 9/2009 |
| WO | 2005/116147 A1 | 12/2005 |
| WO | WO 2009001967 A1 * | 12/2008 |

\* cited by examiner

INK COMPOSITION, INK SET AND IMAGE FORMING METHOD

CROSS-REFERENCE TO RELATED APPLICATION

This application claims priority under 35 USC 119 from Japanese Patent Application No. 2009-217796 filed on Sep. 18, 2009, the disclosure of which is incorporated by reference herein.

BACKGROUND

1. Technical Field

The invention relates to an ink composition, an ink set, and an image forming method.

2. Related Art

As a result of advances in inkjet recording techniques in recent years, inkjet recording methods have come to be used for formation of high-definition images that had previously been formed by applications such as photography and offset printing, and high-quality recording is in great demand.

Inks for use in inkjet recording containing a colorant as a coloring agent, water, a water-soluble organic solvent, and a surfactant are generally-known. An ink which contains a dispersion of a water-insoluble vinyl polymer which contains a pigment has been proposed as being suitable for an ink for recording with high image quality (see, for example, Japanese Patent Application Laid-Open (JP-A) No. 2005-41994). An ink composition which contains a resin emulsion and a colloid of an oxide of an inorganic material has been proposed (see, for example, Japanese Patent No. 3550637) and is considered to be capable of providing favorable images.

SUMMARY OF THE INVENTION

According to an aspect of the invention, an inkjet ink composition including a pigment and colloidal silica, the pigment being covered with a water-insoluble resin including a constituent unit having an acidic group, with which rub resistance to images formed and ink discharge reliability are excellent and deterioration of liquid repellency of an inkjet head member is suppressed, is provided. According to another aspect of the invention, an ink set including the inkjet ink composition, and an inkjet image forming method by using the inkjet ink composition, are provided.

BRIEF DESCRIPTION OF DRAWINGS

Exemplary embodiments of the present invention will be described in detail based on the following figures, wherein.

DETAILED DESCRIPTION

Figure 1:
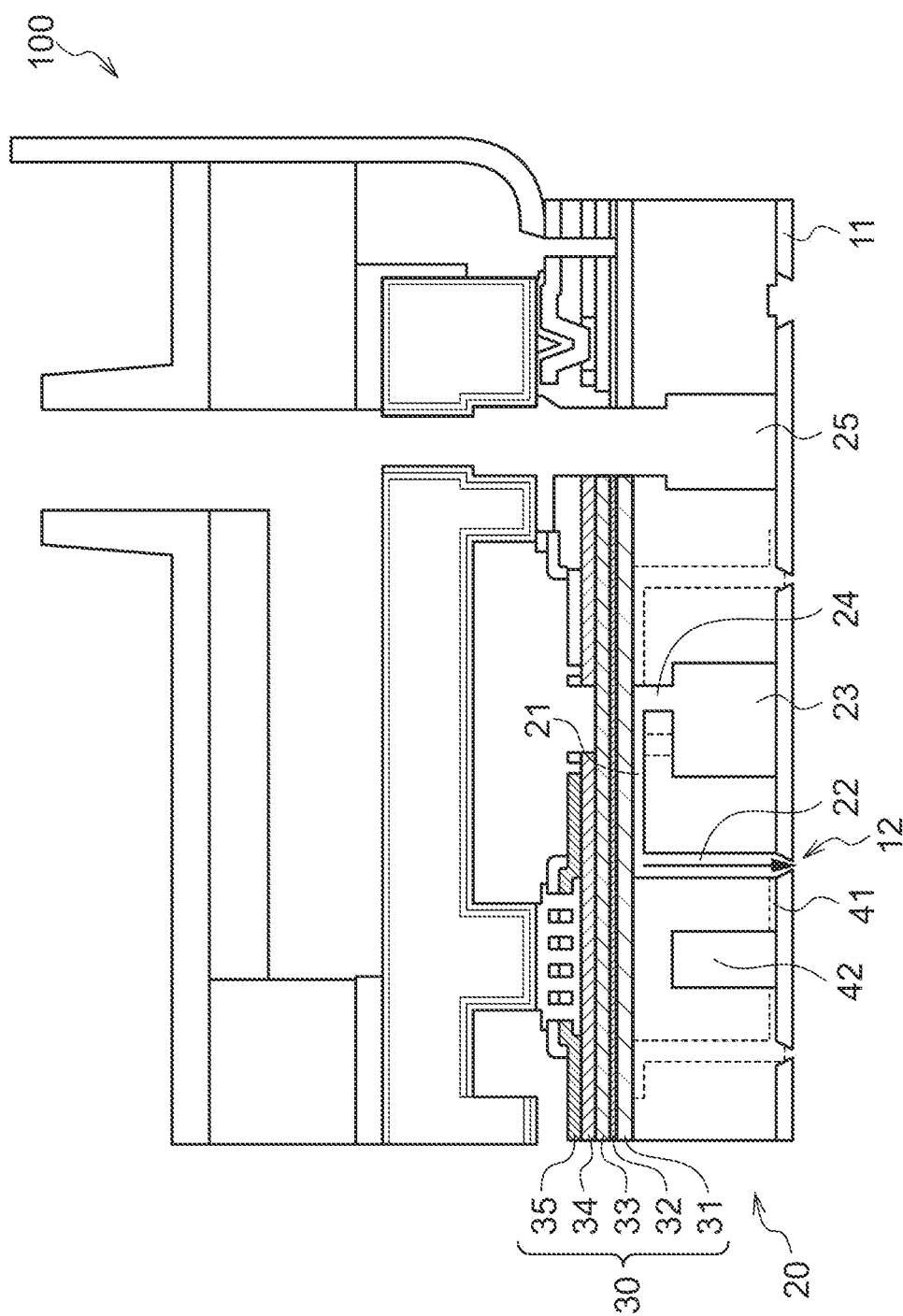
FIG. 1 is a schematic diagram showing one example of an internal structure of an inkjet head.

Liquid-repellency of inkjet head units may be deteriorated when pigments covered with the water-insoluble polymer described in JP-A No. 2005-41994 are used. The ink composition described in Japanese Patent No. 3550637 may have insufficient ink discharge reliability and may provide insufficient rub resistance to images formed therewith.

The present invention is made in view of the circumstances. The present invention is directed to an ink composition having excellent ink discharge reliability, providing excellent rub resistance to images formed therewith, and suppressing deterioration of the liquid-repellency of inkjet head units. The present invention is further directed to an ink set that includes the ink composition, and an inkjet image recording method using the ink composition.

Exemplary embodiments according to the aspect of the invention include, but are not limited to the following items <1> to <16>.

<1> An inkjet ink composition including a pigment and colloidal silica, the pigment being covered with a water-insoluble resin including a constituent unit having an acidic group.

<2> The inkjet ink composition according to the item <1>, wherein an acid value of the water-insoluble resin is in a range of 30 mgKOH/g to 100 mgKOH/g.

<3> The inkjet ink composition according to the item <1> or the item <2>, wherein the water-insoluble resin includes a hydrophilic constituent unit derived from a (meth)acrylic acid monomer and a hydrophobic constituent unit having an aromatic ring group.

<4> The inkjet ink composition according to the item <3>, wherein the hydrophobic constituent unit includes at least one constituent unit represented by the following Formula (1):

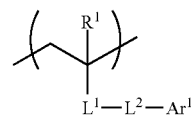

Formula (1)

wherein, in Formula (1), $R^1$ represents a hydrogen atom or a methyl group; $L^1$ represents an unsubstituted or substituted phenylene group; $L^2$ represents a single bond or a divalent linking group; and $Ar^1$ represents a monovalent group derived from a condensed aromatic ring having 8 or more carbon atoms, a heterocycle having (an) aromatic ring(s) condensed therein, or a compound having two or more benzene rings linked to each other.

<5> The inkjet ink composition according to the item <3>, wherein the hydrophobic constituent unit includes at least one constituent unit represented by the following Formula (2):

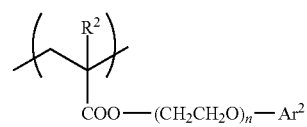

Formula (2)

wherein, in Formula (2), $R^2$ represents a hydrogen atom or a methyl group, and $Ar^2$ represents a monovalent group derived from an unsubstituted or substituted aromatic ring.

<6> The inkjet ink composition according to the item <5>, wherein, in Formula (2), $Ar^2$ represents a monovalent group derived from a condensed aromatic ring having 8 or more carbon atoms, a heterocycle having (an) aromatic ring(s) condensed therein, or a compound having two or more benzene rings linked to each other.

<7> The inkjet ink composition according to any one of the items <1> to <6>, further including a first hydrophilic organic solvent having an I/O value in a range of 0.70 or more but less than 1.00.

<8> The inkjet ink composition according to the item <7>, further including a second hydrophilic organic solvent having an I/O value in a range from 1.00 to 1.50.

<9> The inkjet ink composition according to any one of the items <1> to <8>, having a pH value in a range from 7.5 to 10 at a temperature of 25° C.

<10> The inkjet ink composition according to any one of the items <1> to <9>, wherein the pigment is pigment covered with the water-insoluble resin by using a phase inversion method.

<11> The inkjet ink composition according to any one of the items <1> to <10>, wherein the content of the colloidal silica is from 0.005% by mass to 0.5% by mass with respect to the total amount of the inkjet ink composition.

<12> The inkjet ink composition according to any one of the items <1> to <11>, wherein a volume average particle diameter of the colloidal silica is 25 nm or less.

<13> The inkjet ink composition according to any one of the items <1> to <12>, wherein the content ratio of the colloidal silica to the water-insoluble resin (colloidal silica/water-insoluble resin) in the inkjet ink composition is from 0.0001 to 0.5 on the basis of mass.

<14> An ink set including at least one of the inkjet ink composition of any one of the items <1> to <13> and at least one treatment liquid configured to form aggregates when contacted with the inkjet ink composition.

<15> An inkjet image forming method including discharging the inkjet ink composition of any one of the items <1> to <13> from an inkjet head equipped with a silicon nozzle plate, onto a recording medium.

<16> The inkjet image forming method of the item <15>, further including applying a treatment liquid which is capable of forming an aggregate when contacted with the inkjet ink composition of any one of the items <1> to <13>, on the recording medium.

<Ink Composition for Inkjet Recording>

The ink composition for inkjet recording of the present invention (hereinafter, may be simply referred to as "ink composition") is configured to include at least one type of colorant particles, at least one type of particles of a self-dispersing polymer including a constituent unit derived from a hydrophilic monomer and a constituent unit derived from a hydrophobic monomer, and at least one type of colloidal silica, and, if necessary, other components.

By using the ink composition having such configuration, ink discharge reliability is excellent and lowering of liquid repellency of an inkjet head member is suppressed.

In general, liquid repellency is imparted to the member that constructs the inkjet head in order to maintain the ink ejection performance. This liquid repellency can be imparted, for example, by processing the member surface using a fluorine-containing surface finishing agent. It is known that the liquid repellency of the inkjet head member gradually lowers when the inkjet head is used over a long period of time.

Further, there is a case where a nozzle plate is configured to include silicon or the like in order to precisely form especially fine nozzles (discharge ports). Also in the inkjet head equipped with such a nozzle plate formed from silicon or the like, there are cases where the lowering of liquid repellency of the nozzle plate exerts influence on the ink discharge reliability.

The ink composition for inkjet recording of the present invention can suppress the lowering of liquid repellency of the inkjet head member more effectively, even in the case of using an inkjet head equipped with such a nozzle plate formed from silicon or the like.

[Colloidal Silica]

Colloidal silica is colloid that comprises fine particles of inorganic oxides including silicon, in which an average particle diameter of the fine particles is several hundred nm or less. Colloidal silica includes silicon dioxide (including hydrates thereof) as a main component and may contain aluminate as a minor component. Examples of the aluminate, which may be contained as a minor component, include sodium aluminate and potassium aluminate.

Further, inorganic salts such as sodium hydroxide, potassium hydroxide, lithium hydroxide, and ammonium hydroxide or organic salts such as tetramethylammonium hydroxide may be contained in the colloidal silica. These inorganic salts and organic salts function, for example, as a stabilizer of colloid.

The dispersing medium for colloidal silica is not particularly limited and may be any of water, an organic solvent, or a mixture of water and an organic solvent. The organic solvent may be a water-soluble organic solvent or a water-insoluble organic solvent. However, the organic solvent is preferably a water-soluble organic solvent. Specific examples thereof include methanol, ethanol, isopropyl alcohol, and n-propanol.

There is no particular limitation on the method for producing colloidal silica, and colloidal silica can be produced by a generally used method. For example, colloidal silica can be produced through an Aerosil synthesis by thermal decomposition of silicon tetrachloride, or may be produced from water glass. Alternatively, colloidal silica can be produced according to a liquid phase synthesis method including hydrolysis of an alkoxide (see, for example, "Seni to Kogyo", vol. 60, No. 7, page 376, 2004), or the like.

There is no particular limitation on the average particle diameter of the particles contained in the colloidal silica according to the present invention. For example, the average particle diameter may be set from 1 nm to 200 nm. The average particle diameter is preferably from 1 nm to 100 nm, more preferably from 3 nm to 50 nm, even more preferably from 3 nm to 25 nm, and particularly preferably from 5 nm to 20 nm.

When the average particle diameter is 200 nm or less, damages (for example, lowering of liquid repellency or the like) caused by ink to the members which construct the inkjet head, such as a substrate, a protective film, a liquid-repellent film, and the like, may be more effectively suppressed. It is thought that, by making the average particle diameter smaller, a total surface area of particles increases, so that damages to the members which construct the inkjet head is more effectively suppressed. Moreover, it is preferable that the average particle diameter of the particles is 200 nm or less, also from the viewpoints of discharge reliability of the ink composition and suppression of the abrasive effect caused by the particles. Further, when the average particle diameter is 1 nm or more, productivity is enhanced, and colloidal silica that exhibits a smaller dispersion in performance may be obtained.

In the present invention, the average particle diameter of the colloidal silica is represented by a volume average particle diameter. The volume average particle diameter can be determined according to a general method for dispersed particles such as a light scattering method or a laser diffraction method.

The shape of the colloidal silica is not particularly limited so long as it does not disturb the ejection performance of the ink. For example, the shape may be a spherical shape, a long shape, a needle-like shape, or a shape like a string of beads. Above all, it is preferred that the colloidal silica is spherical, from the viewpoint of discharge reliability of ink.

The colloidal silica, which can be used in the present invention, may be produced by the production method described above, or may be a commercially available product. Specific examples of the commercially available product include LUDOX AM, LUDOX AS, LUDOX LS, LUDOX TM, and LUDOX HS (all trade names, manufactured by E.I. Du Pont de Nemours & Co.); SNOWTEX S, SNOWTEX XS, SNOWTEX 20, SNOWTEX 30, SNOWTEX 40, SNOWTEX N, SNOWTEX C, and SNOWTEX O (all trade names, manufactured by Nissan Chemical Industries, Ltd.); SYTON C-30 and SYTON ZOO (all trade names, manufactured by Mons anto Co.); NALCOAG-1060 and NALCOAG-ID21 to 64 (all trade names, manufactured by Nalco Chem. Co.); METHANOL SOL, IPA SOL, MEK SOL, and TOLUENE SOL (all trade names, manufactured by Fuso Chemical Co., Ltd.), CATALOID-S, CATALOID-F120, CATALOID SI-350, CATALOID SI-500, CATALOID SI-30, CATALOID S-20L, CATALOID S-20H, CATALOID S-30L, CATALOID S-30H, CATALOID SI-40, and OSCAL-1432 (isopropyl alcohol sol) (all trade names, manufactured by JGC Catalysts and Chemicals Ltd.); ADELITE (trade name, manufactured by Asahidenka Co., Ltd.); and, as examples of colloidal silica in the shape of a string of beads, SNOWTEX ST-UP, SNOWTEX PS-S, SNOWTEX PS-M, SNOWTEX ST-OUP, SNOWTEX PS-SO, and SNOWTEX PS-MO (all trade names, manufactured by Nissan Chemical Industries, Ltd.). These products are easily available.

The pH of the above commercially available colloidal silica dispersion liquid is often adjusted to pH of acidic or alkaline. This is because the region where colloidal silica is stably dispersed exists in an acidic side or alkaline side. In the case of adding a commercially available colloidal silica dispersion liquid to the ink composition, the pH of the region where the colloidal silica is stably dispersed and the pH of the ink composition should be taken in consideration.

The content of the colloidal silica in the ink composition in exemplary embodiments of the invention is not particularly limited. For example, the content can be set from 0.0001% by mass to 10% by mass of the total amount of the ink composition. The content of the colloidal silica is preferably from 0.001% by mass to 1% by mass of the total amount of the ink composition, more preferably from 0.005% by mass to 0.5% by mass of the total amount of the ink composition, and particularly preferably from 0.01% by mass to 0.1% by mass of the total amount of the ink composition. When the content of the colloidal silica in the ink composition is equal to or less than the upper limit described above, the discharge reliability of the ink composition is further enhanced, and the influence of the abrasive effect caused by silica particles upon the inkjet head may be more effectively suppressed. Further, when the content is equal or greater than the lower limit described above, the lowering of liquid repellency of the inkjet head member may be more effectively suppressed.

Moreover, it is preferable that the ink composition of the present invention contains colloidal silica having a volume average particle diameter of from 3 nm to 25 nm in an amount of from 0.001% by mass to 1% by mass of the total amount of the ink composition, from the viewpoints of suppression of the lowering of liquid repellency of the inkjet head member and the ink discharge reliability. It is more preferable that the ink composition contains colloidal silica having a volume average particle diameter of from 5 nm to 20 nm in an amount of from 0.005% by mass to 0.5% by mass of the total amount of the ink composition.

[Pigment Covered with Water-Insoluble Resin]

The ink composition contains at least one pigment covered with a water-insoluble resin which contains a structural unit having an acidic group. This configuration may facilitate to provide excellent discharge reliability to the ink composition and to provide excellent rub resistance to images formed from the ink composition.

There is no particular limitation to specific embodiments of the pigment as long as entire or at least a part of the surface thereof is covered with the water-insoluble resin.

(Water-Insoluble Resin)

The water-insoluble resin contains at least one structural unit having an acidic group, and may further contain one or more other structural unit(s) if necessary. In preferable embodiments, in view of achieving stable presence in the ink composition, reducing adhering and accumulation of aggregates, and enabling easy removal of adhered aggregates, the water-insoluble resin may preferably contain at least one hydrophilic structural unit (A) and at least one hydrophobic structural unit (B). In more preferable embodiments, the acidic group may be contained in one of the hydrophilic structural unit (A).

The "water-insoluble polymer" herein refers to a polymer whose dissolved amount to 100 g of water at 25° C. is 5 g or smaller when the polymer is dissolved in the water. The "dissolved amount" is an amount of (a part of) the water-insoluble polymer dissolved in a solvent (water) when acidic groups of the water-insoluble polymer are completely neutralized with sodium hydroxide.

Hydrophilic Structural Unit

There is no particular limitation to the hydrophilic structural unit in the water-insoluble polymer as long as it contains at least one hydrophilic functional group. The hydrophilic structural unit may contain an ionic hydrophilic group or a nonionic hydrophilic group. In preferable embodiments, the hydrophilic structural unit may have an acidic group. The hydrophilic structural unit having an acidic group may be derived from a monomer containing an acidic group, or may be a structural unit formed by introducing, by a macromolecular reaction, an acidic group to a structural unit having no acidic group in a polymer chain which has been formed by polymerization.

The acid group is not particularly limited and may include, from the viewpoint of stability of the emulsion state or dispersion state, a carboxy group, a phosphoric acid group, and a sulfonic acid group. Among these, a carboxy group is preferable from the viewpoint of dispersion stability in an ink composition.

As the acid group containing monomer, an acid group containing monomer having an acid group and an ethylenically unsaturated bond is preferable. Examples of the acid group containing monomer may include an unsaturated carboxylic acid monomer, an unsaturated sulfonic acid monomer, and an unsaturated phosphoric acid monomer.

Examples of the unsaturated carboxylic monomer may include acrylic acid, methacrylic acid, crotonic acid, itaconic acid, maleic acid, fumaric acid, citraconic acid, and 2-methacryloyloxymethyl succinic acid. Examples of the unsaturated sulfonic acid monomer may include styrenesulfonic acid, 2-acrylamido-2-methylpropanesulfonic acid, 3-sulfopropyl(meth)acrylate, and bis(3-sulfopropyl) itaconate. Examples of the unsaturated phosphoric acid monomer may include vinylphosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate.

Among the acid group containing monomers, from the viewpoints of dispersion stability and ejection stability, an unsaturated carboxylic monomer is preferable, and acrylic acid and methacrylic acid are more preferable. Specifically, the repeating unit having an acid group is preferably a structural unit derived from (meth)acrylic acid.

In the water-insoluble resin, either or both of a structural unit derived from acrylic acid and a structural unit derived from methacrylic acid are preferably incorporated.

When the hydrophilic group includes a basic group, examples of the basic group include an amino group and an amido group in which a nitrogen atom is unsubstituted.

Examples of the hydrophilic structural unit (A) having a basic group include a structural unit derived from a monomer having a basic hydrophilic group. Examples of the monomer having a basic hydrophilic group include (meth)acrylate having a basic hydrophilic group, (meth)acrylamide having a basic hydrophilic group, and vinyl monomers such as vinyl esters having a basic hydrophilic group.

A monomer which provides the hydrophilic structural unit having a basic hydrophilic group may preferably have a functional group which can form a polymer such as an ethylenically unsaturated bond and a basic hydrophilic functional group. Such monomer may be selected from known monomers, and specific examples thereof which may be preferably used include (meth)acrylamides, aminoethyl(meth)acrylates, and aminopropyl(meth)acrylates.

When the hydrophilic group includes a nonionic hydrophilic group, examples of the nonionic hydrophilic group include a hydroxyl group and alkylene oxides such as polyethylene oxide or polypropylene oxide described below.

Examples of the hydrophilic structural unit (A) having a nonionic hydrophilic group include a unit derived from a monomer having a nonionic hydrophilic group. Examples of the monomer having a nonionic hydrophilic group include (meth)acrylate having a nonionic hydrophilic group, (meth)acrylamide having a nonionic hydrophilic group, and vinyl monomers such as vinyl esters having a hydrophilic group.

The monomer that forms the hydrophilic structural unit having a nonionic hydrophilic group is preferably a monomer that has a functional group capable of forming a polymer such as an ethylenically unsaturated bond and a nonionic hydrophilic functional group, and may be selected from known monomers. Preferable specific examples of the monomer may include hydroxylethyl(meth)acrylate, hydroxybutyl (meth)acrylate, and (meth)acrylate that contains an alkyleneoxide polymer.

The hydrophilic structural unit (A) having a nonionic hydrophilic group may be formed by polymerization of corresponding monomers, but may be formed by introducing a hydrophilic functional group into a polymer chain after polymerization.

As the hydrophilic structural unit having a nonionic hydrophilic group, a hydrophilic structural unit having an alkylene oxide structure is more preferable. As the alkylene moiety of the alkylene oxide structure, from the viewpoint of hydrophilicity, an alkylene moiety having 1 to 6 carbon atoms is preferable, an alkylene moiety having 2 to 6 carbon atoms is more preferable, and an alkylene moiety having 2 to 4 carbon atoms is particularly preferable. The polymerization degree of the alkylene oxide structure is preferably 1 to 120, more preferably 1 to 60, and particularly preferably 1 to 30.

In a preferable embodiment, the hydrophilic structural unit having a nonionic hydrophilic group is a hydroxyl group-containing hydrophilic structural unit. The number of hydroxy groups in the structural unit is not particularly limited and is preferably 1 to 4, more preferably 1 to 3, and still more preferably 1 or 2, from the viewpoints of the hydrophilicity of the water-insoluble resin and compatibility with a solvent and other monomers at the time of polymerization.

In the foregoing description, the content of the hydrophilic structural unit varies, for example, depending on the ratio of the hydrophobic structural unit (B) described later. For example, when the water-insoluble resin is composed of acrylic acid and/or methacrylic acid (hydrophilic structural unit (A)) and the hydrophobic structural unit (B) described later, the content of acrylic acid and/or methacrylic acid is determined by "100–(% by mass of the hydrophobic structural unit)".

The hydrophilic structural units (A) may be used alone or as a mixture of two or more of them.

—Hydrophobic Structural Unit—

The water-insoluble polymer has a structural unit having an acidic group. In embodiments, the water-insoluble polymer may preferably further have at least one hydrophobic structural unit (B). There is no particular limitation to the hydrophobic structural unit in the water-insoluble polymer as long as it contains at least one hydrophobic functional group. In embodiments, the hydrophobic structural unit may preferably include at least one structural unit having an aromatic ring, and may more preferably include a structural unit represented by the following Formula (1).

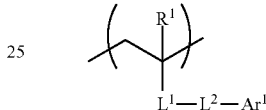

Formula (1)

In Formula (1), $R_1$ represents a hydrogen atom or a methyl group. $L_1$ represents an unsubstituted or substituted phenylene group. $L_2$ represents a single bond or a divalent linking group. $Ar^1$ represents a monovalent group derived from a condensed aromatic ring having 8 or more carbon atoms, a heterocycle having an aromatic ring condensed therein, or a compound having two or more benzene rings linked to each other.

In Formula (1), $R_1$ represents a hydrogen atom or a methyl group, and preferably a methyl group.

$L_1$ represents an unsubstituted or substituted phenylene group. An unsubstituted phenylene group is preferable as $L_1$. $L_2$ represents a single bond or a divalent linking group. The divalent linking group is preferably a linking group having 1 to 30 carbon atoms, more preferably a linking group having 1 to 25 carbon atoms, even more preferably a linking group having 1 to 20 carbon atoms, and particularly preferably a linking group having 1 to 15 carbon atoms. Particularly preferable examples of the linking group include an alkyleneoxy group having 1 to 25 carbon atoms (more preferably 1 to 10 carbon atoms), an imino group (—NH—), a sulfamoyl group, a divalent linking group including an alkylene group such as an alkylene group having 1 to 20 carbon atoms (more preferably 1 to 15 carbon atoms) or an ethylene oxide group [—(CH$_2$CH$_2$O)$_n$—, n=1 to 6], and a combination of two or more thereof.

$Ar^1$ represents a monovalent group derived from a condensed aromatic ring having 8 or more carbon atoms, a heterocycle having an aromatic ring condensed therein, or a compound having two or more benzene rings linked to each other.

The "condensed aromatic ring having 8 or more carbon atoms" may be an aromatic ring having two or more benzene rings condensed therein or an aromatic ring having 8 or more carbon atoms composed of at least one aromatic ring and a ring formed by an alicyclic hydrocarbon condensed with the aromatic ring. Specific examples include naphthalene, anthracene, fluorene, phenanthrene, and acenaphthene.

The "heterocycle having an aromatic ring condensed therein" is a compound consisting of a heteroatom-free aromatic compound (preferably a benzene ring) and a heteroatom-containing cyclic compound condensed with each other. The heteroatom-containing cyclic compound is preferably a five- or six-membered ring. The heteroatom is preferably a nitrogen atom, an oxygen atom or a sulfur atom. The heteroatom-containing cyclic compound may have a plurality of heteroatoms. In this case, the heteroatoms may be the same as or different from each other. Specific examples of the heterocycle having an aromatic ring condensed therein include phthalimide, acridone, carbazole, benzoxazole, and benzothiazole.

Specific examples of the monovalent group derived from a compound having two or more benzene rings linked to each other include a biphenyl group, a terphenyl group, a diphenylmethyl group, a triphenylmethyl group and the like.

Specific examples of monomers that forms the repeating unit represented by Formula (1) include the following monomers. The present invention is not limited to these monomers.

(1)

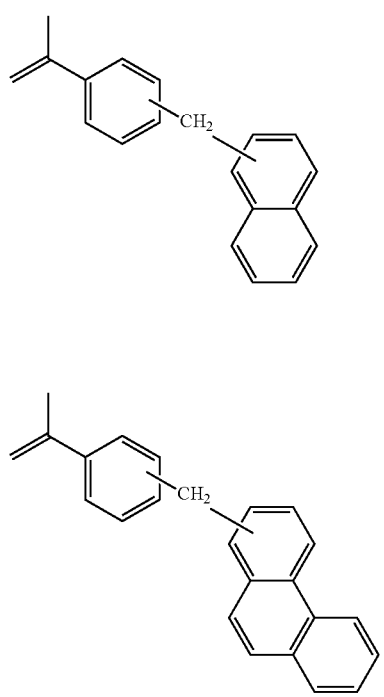

(2)

(3)

M-25/M-27

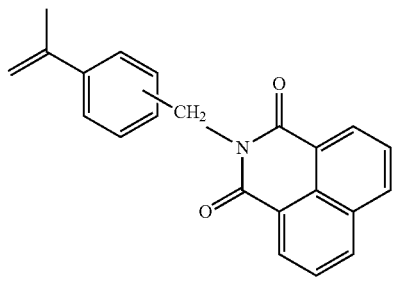

M-28/M-29

M-25/M-27 represents a mixture of monomers M-25 and M-27, each of which has the substituent at m- or p-position.

M-28/M-29 represents a mixture of monomers M-28 and M-29, each of which has the substituent at m- or p-position.

(5)

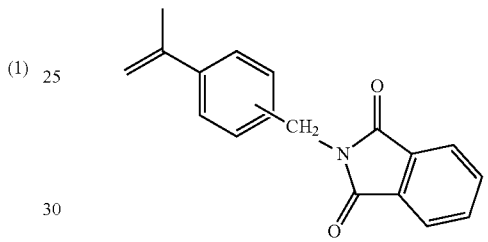

(6)

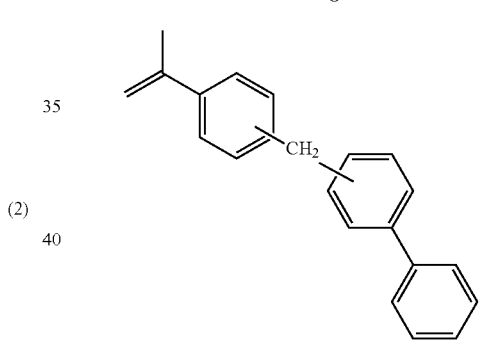

In exemplary embodiments of the invention, $Ar^1$ in the repeating unit represented by the foregoing Formula (1) is preferably a monovalent group derived from acridone or phthalimide from the viewpoint of the dispersion stability of the coated pigment, and more preferably a monovalent group derived from acridone.

As the repeating unit represented by Formula (1), from the viewpoint of dispersion stability of the pigment, a repeating unit that is specified by selecting an unsubstituted phenylene group as $L_1$, a divalent linking group (preferably methylene) as $L_2$, and a monovalent group derived from acridone as $Ar^1$ is preferable.

The content of the repeating unit represented by Formula (1) in the water-insoluble resin is preferably in the range of from 5% by mass to 25% by mass, with respect to the total mass of the water-insoluble resin, and more preferably in the range of from 10% by mass to 18% by mass.

When the content is 5% by mass or more, generation of image defects such as white spots tends to be suppressed markedly desirably, on the other hand, when the content is 25% by mass or less, problems of production suitability caused by lowering the solubility of the water-insoluble resin in a polymerization reaction liquid (for example, methyl ethyl ketone) tend not to be brought about desirably.

The water-insoluble resin in the preferable exemplary embodiment of the invention may include a structural unit represented by the following Formula (2) other than the repeating unit represented by Formula (1).

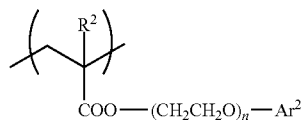

Formula (2)

In Formula (2), $R^2$ represents a hydrogen atom or a methyl group, and preferably a methyl group.

$Ar^2$ represents a monovalent group derived from an unsubstituted or substituted aromatic ring (aromatic ring group). When the aromatic ring is substituted by a substituent, examples of the substituent include a halogen atom, an alkyl group, an alkoxy group, a hydroxy group, a cyano group and, an alkoxycarbonyl group, and the aromatic ring may form a condensed ring. When the aromatic ring forms a condensed ring, the condensed ring may be, for example, a condensed aromatic ring having 8 or more carbon atoms, or a heterocycle having (an) aromatic ring(s) condensed therein. Further, $Ar^2$ may be a monovalent group derived from a compound having two or more aromatic rings linked to each other.

In Formula (2), each of "a condensed aromatic ring having 8 or more carbon atoms" and "a heterocycle having (an) aromatic ring(s) condensed therein" has the same definition as "a condensed aromatic ring having 8 or more carbon atoms" and "a heterocycle having (an) aromatic ring(s) condensed therein" in Formula (1) respectively. Further, "a monovalent group derived from a compound having two or more aromatic rings linked to each other" in Formula (2) preferably includes "a monovalent group derived from a compound having two or more aromatic rings linked to each other" in Formula (1).

The aromatic ring group represented by $Ar^2$ is linked via an ester group and an ethylene oxide chain to the main chain of the water-insoluble resin, and the aromatic ring group is not directly linked to the main chain, and thus a suitable distance is maintained between the hydrophobic aromatic ring and the hydrophilic structural unit, so that the water-insoluble resin interacts readily with, and is adsorbed firmly onto, a pigment to improve dispersibility.

In particular, the aromatic ring group represented by $Ar^2$ is preferably an unsubstituted phenyl group or an unsubstituted naphthyl group, and particularly preferably an unsubstituted phenyl group.

n is an average repeating number of the ethyleneoxy units in the water-insoluble resin used for the resin-coated pigment contained in the aqueous ink composition. n is in the range of 1 to 6, and preferably 1 to 2.

Specific examples of monomers that forms the repeating unit represented by Formula (2) include the following monomers.

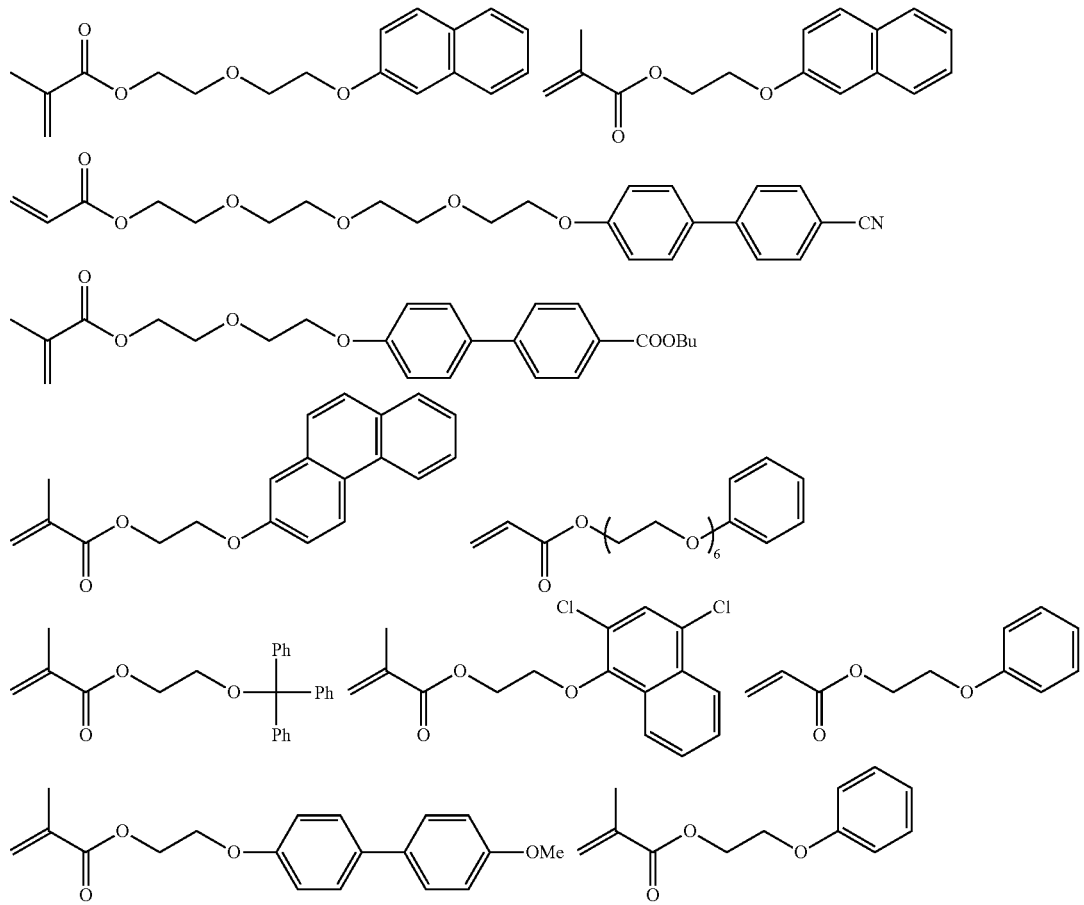

From the viewpoint of dispersion stability, it is particularly preferable that in the repeating unit represented by Formula (2), $R^2$ is a methyl group, $Ar^2$ is an unsubstituted phenyl group, and n is 1 to 2.

The content of the repeating unit of Formula (1) in the water-insoluble resin is preferably in the range of 30% by mass to 70% by mass, and more preferably in the range of 40% by mass to 50% by mass, based on the total mass of the water-insoluble resin. When the content is 30% by mass or more, dispersibility is good, and when the content is 70% by mass or less, the adhesion and deposition of the aggregate may be prevented, the removability of adhered aggregate (maintenance properties) is good, and generation of imaging defects such as white spots may be prevented.

The water-insoluble resin in exemplary embodiments of the invention is preferably a resin including a hydrophilic structural unit (A) and a hydrophobic structural unit (B), from the viewpoint of allowing the water-insoluble resin to be stably present in an aqueous ink, to reduce adhesion or deposition of the aggregate, and to facilitate removal of the adhered aggregate. Herein, the hydrophobic structural unit (B) preferably includes the repeating unit represented by Formula (1) or Formula (2) above.

The water-insoluble resin of the present invention may further have an additional hydrophobic structural unit (B') other than the repeating unit represented by Formula (1) and the repeating unit represented by Formula (2). Examples of the hydrophobic structural unit (B') may include a structural units derived from vinyl monomers such as (meth)acrylates, (meth)acrylamides, styrenes or vinylesters which do not belong to the hydrophilic structural unit (A) (for example, those having no hydrophilic functional group), a hydrophobic structural unit having an aromatic ring that is linked to an atom of the main chain thereof through a linking group, and the like. These structural units may be used one kind alone or two or more kinds in combination.

Examples of the (meth)acrylates include methyl(meth) acrylate, ethyl(meth)acrylate, butyl(meth)acrylate, isobutyl (meth)acrylate, and hexyl(meth)acrylate. Among them, methyl(meth)acrylate, ethyl(meth)acrylate, and butyl(meth) acrylate are preferable, and methyl(meth)acrylate and ethyl (meth)acrylate are particularly preferable.

Examples of the (meth)acrylamides include N-cyclohexyl (meth)acrylamide, N-(2-methoxyethyl) (meth)acrylamide, N,N-diallyl(meth)acrylamide, and N-allyl(meth)acrylamide.

Examples of the styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, chloromethylstyrene, hydroxystyrene protected by a group removable with an acidic substance (for example, t-Boc), methyl vinyl benzoate, α-methylstyrene, and vinylnaphthalene. Among them, styrene and α-methylstyrene are preferable.

Examples of the vinyl esters include vinyl acetate, vinyl chloroacetate, vinyl propionate, vinyl butyrate, vinyl methoxyacetate, and vinyl benzoate. Among them, vinyl acetate is preferable.

The above-described "hydrophobic structural unit containing an aromatic ring that is linked to an atom in the main chain via a linking group" is preferably a structural unit wherein the proportion of the aromatic ring linked to an atom in the main chain of the copolymer via a linking group is from 15% by mass to 27% by mass, more preferably from 15% by mass to 25% by mass, and even more preferably from 15% by mass to 20% by mass with respect to the copolymer.

The aromatic ring is linked to the atom in the main chain of the copolymer not directly but via a linking group. Therefore, an adequate distance is kept between the hydrophobic aromatic ring and the hydrophilic structural unit, so that the copolymer readily interacts with the pigment and is firmly adsorbed thereon, thus improving the dispersibility of the pigment.

The "hydrophobic structural unit containing an aromatic ring that is linked to an atom in the main chain via a linking group" is preferably a structural unit represented by the following Formula (3) (excluding the repeating unit represented by Formula (1) and the repeating unit represented by Formula (2)).

Formula (3)

In Formula (3), $R^{11}$ represents a hydrogen atom, a methyl group, or a halogen atom. $L^{11}$ represents *—COO—, *—OCO—, *—CONR$^{12}$—, or *—O—, and $R^{12}$ represents a hydrogen atom or an alkyl group having 1 to 10 carbon atoms. In the group represented by $L^{11}$, an asterisk (*) denotes a bond connected to the main chain.

$L^{12}$ represents a single bond or a divalent linking group having 1 to 30 carbon atoms. When $L^{12}$ is a divalent linking group, it is preferably a linking group having 1 to 25 carbon atoms, more preferably a linking group having 1 to 20 carbon atoms, and even more preferably a linking group having 1 to 15 carbon atoms.

Among them, particularly preferable examples include an alkyleneoxy group having 1 to 25 (more preferably 1 to 10 carbon atoms) carbon atoms, an imino group (—NH—), a sulfamoyl group, and divalent linking groups containing an alkylene group, such as an alkylene group having 1 to 20 carbon atoms (more preferably 1 to 15 carbon atoms) or an ethylene oxide group [—(CH$_2$CH$_2$O)$_n$—, n=1 to 6], and combinations of two or more of these groups.

In Formula (3), $Ar^{11}$ represents a monovalent group derived from an aromatic ring.

The aromatic ring group which derives the monovalent group represented by $Ar^{11}$ is not particularly limited, and examples of the aromatic ring include a benzene ring, a condensed aromatic ring having eight or more carbon atoms, a heterocycle having (an) aromatic ring(s) condensed therein, and a compound having two or more benzene rings linked to each other. The details about the condensed aromatic ring having eight or more carbon atoms, the heterocycle having (an) aromatic ring(s) condensed therein, and the compound having two or more benzene rings linked to each other have been described above.

Specific examples of a monomer capable of forming the "hydrophobic structural unit containing an aromatic ring that is linked to an atom in the main chain via a linking group" are shown below. However, the invention is not limited to the following specific examples.

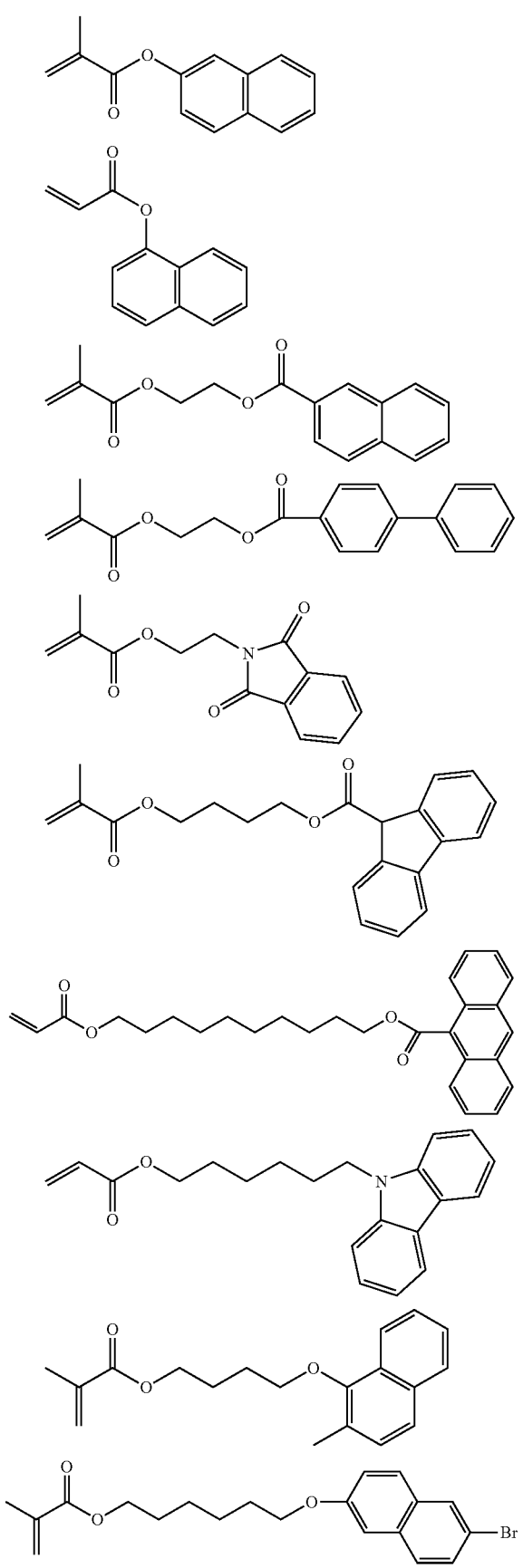
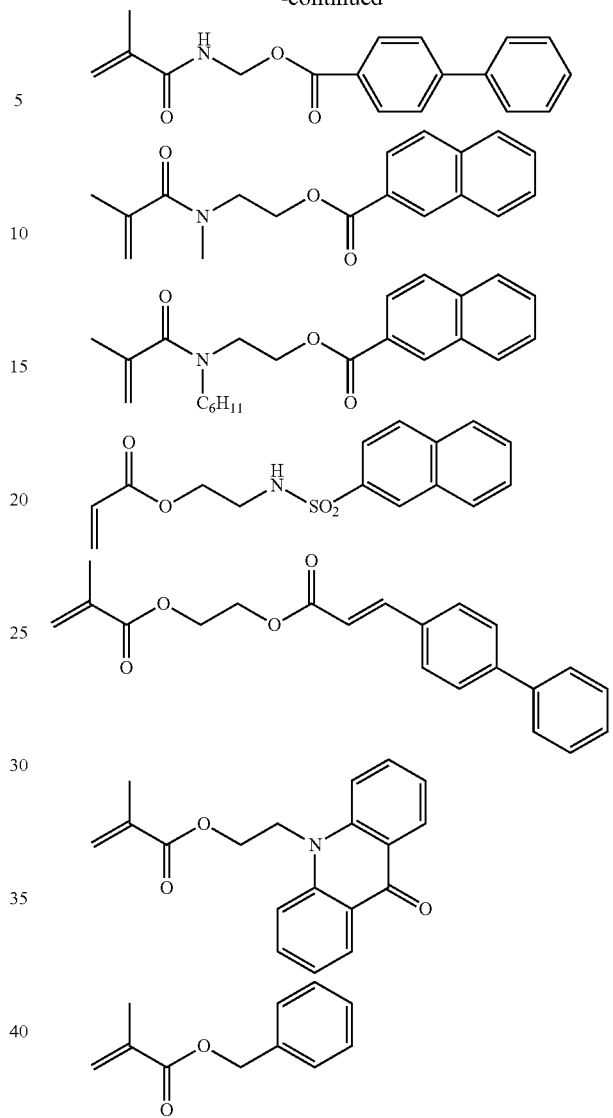

The water-insoluble resin of the present invention is, among the above, preferably characterized in that the hydrophilic structural unit (A) is (meth)acrylic acid and the hydrophobic structural unit (B) is at least one kind selected from (i) a repeating unit represented by Formula (1) (preferably a structural unit derived from the foregoing M-25/M-27 or M-28/M-29), (ii) a repeating unit represented by Formula (2) (preferably a repeating unit derived from phenoxyethyl (meth)acrylate), and (iii) a hydrophobic structural unit (B') other than the foregoing structural units (preferably a structural unit derived from methyl(meth)acrylate, ethyl(meth)acrylate, or benzyl methacrylate).

Furthermore, the water-insoluble resin of the present invention is preferably characterized in that the hydrophilic structural unit (A) is (meth)acrylic acid and the hydrophobic structural unit (B) contains at least one kind of the above (i) and (ii).

Particularly, the water-insoluble resin of the present invention is preferably characterized in that the hydrophilic structural unit (A) is (meth)acrylic acid and the hydrophobic structural unit (B) contains at least one kind of the above (i) and (ii) and further contains (iii).

In the water-insoluble resin in exemplary embodiments of the invention, although the ratio of the hydrophilic structural unit (A) to the hydrophobic structural unit (B) (including the repeating unit represented by Formula (2), the repeating unit represented by Formula (1) and the other hydrophobic structural units (B')) depends on the degrees of the hydrophilicity and hydrophobicity of these components, the content of the hydrophilic structural units (A) in the water-insoluble resin is preferably 15% by mass or less. The content of the hydrophobic structural units (B) is preferably more than 80% by mass, and more preferably 85% by mass or more with respect to the total mass of the water-insoluble resin.

When the content of the hydrophilic structural unit (A) is 15% by mass or less, the amount of the component that dissolves itself in the aqueous medium is decreased, which results in the improvement of pigment properties such as dispersibility, whereby good ink ejection properties are achieved during inkjet recording.

The content ratio of the hydrophilic structural unit (A) is preferably more than 0% by mass but 15% by mass or less, more preferably from 2% by mass to 15% by mass, even more preferably from 5% by mass to 15% by mass, and particularly preferably from 8% by mass to 12% by mass with respect to the total mass of the water-insoluble resin.

In exemplary embodiments of the invention, the acid value of the water-insoluble resin is preferably from 30 mgKOH/g to 100 mgKOH/g, more preferably from 30 mgKOH/g to 85 mgKOH/g, and particularly preferably from 50 mgKOH/g to 85 mgKOH/g from the viewpoints of pigment dispersibility and storage stability.

The acid value is defined as the mass (mg) of KOH necessary for completely neutralizing 1 g of the water-insoluble resin, and measured by the method described in Japanese Industrial Standard (JIS K0070, 1992), the disclosure of which is incorporated by reference herein.

The weight average molecular weight (Mw) of the water-insoluble resin in exemplary embodiments of the invention is preferably 30,000 or more, more preferably from 30,000 to 150,000, even more preferably from 30,000 to 100,000, and particularly preferably from 30,000 to 80,000. If the molecular weight is 30000 or more, the water-insoluble resin may provide a good steric repulsion effect as a dispersant, and is readily adsorbed on the pigment owing to the steric effect.

The number average molecular weight (Mn) of the water-insoluble resin is preferably about 1,000 to about 100,000, and particularly preferably about 3,000 to about 50,000. When the number average molecular weight is within the above-described range, the water-insoluble resin may serve as a coating on the pigment or a coating of the ink composition. The water-insoluble resin in exemplary embodiments of the invention is preferably used in the form of an alkali metal salt or an organic amine salt.

The molecular weight distribution of the water-insoluble resin in exemplary embodiments of the invention (weight average molecular weight/number average molecular weight) is preferably from 1 to 6, and more preferably from 1 to 4. When the molecular weight distribution is within the above-described range, the resulting ink has improved dispersion stability and ejection stability.

The number average molecular weight and the weight average molecular weight are measured by the differential refractometer detection with THF as a solvent in a GPC analyzer using columns TSKGEL SUPER HZM-H, TSKGEL SUPER HZ4000 and TSKGEL SUPER HZ2000 (trade name; all manufactured by Tosoh Corporation), and is obtained in terms of polystyrene used as a reference material.

The water-insoluble resin in exemplary embodiments of the invention may be synthesized by any polymerization method, for example, solution polymerization, precipitation polymerization, suspension polymerization, bulk polymerization, or emulsion polymerization. The polymerization reaction may be carried out under a known system, such as a batch, semi-continuous, or continuous system. Initiation of the polymerization may be carried out with a radical initiator, or photoirradiation or radiation-irradiation. These methods of polymerization and initiation of polymerization are described in, for example, "Kobunshi Gosei Hoho" by Teiji Tsuruta, Revised Edition (published by Nikkan Kogyo Shimbun, Ltd., 1971) and "Kobunshi Gosei no Jikkenho" by Takayuki Ohtu and Masaetu Kinoshita (published by Kagaku-Dojin Publishing Company Inc., 1972) pages 124 to 154.

Among these polymerization methods, a solution polymerization method using a radical initiator is preferable. Examples of the solvent used in the solution polymerization method include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. These solvents may be used alone or in a combination of two or more of them, or may be mixed with water as a mixed solution. The polymerization temperature should be chosen in consideration of the molecular weight of the intended polymer and the type of the initiator, and is usually from 0° C. to 100° C., and is preferably from 50° C. to 100° C. The reaction pressure may be appropriately selected, and is usually from 1 kg/cm² to 100 kg/cm², and particularly preferably from about 1 kg/cm² to about 30 kg/cm². The reaction period may be about 5 hours to about 30 hours. The resulting resin may be subjected to purification treatment such as reprecipitation.

Specific examples of preferable water-insoluble resins in exemplary embodiments of the invention are shown below. The invention is not limited to these examples. In the following Formula, a, b and c each independently represent the content of the correspondent repeating unit % by mass in the polymer.

$$-(CH_2-\underset{\underset{\underset{(CH_2-CH_2-O)_n-C_6H_5}{|}}{COO}}{\overset{R^{11}}{\overset{|}{C}}})_a-$$

$$-(CH_2-\underset{\underset{COOH}{|}}{\overset{R^{21}}{\overset{|}{C}}})_b- \quad -(CH_2-\underset{\underset{COO-R^{32}}{|}}{\overset{R^{31}}{\overset{|}{C}}})_c-$$

| | $R^{11}$ | n | $R^{21}$ | $R^{31}$ | $R^{32}$ | a | b | c | Mw |
|---|---|---|---|---|---|---|---|---|---|
| B-1 | $CH_3$ | 1 | $CH_3$ | $CH_3$ | $-CH_3$ | 60 | 9 | 31 | 35500 |
| B-2 | H | 1 | H | H | $-CH_2CH_3$ | 69 | 10 | 21 | 41200 |
| B-3 | $CH_3$ | 2 | $CH_3$ | $CH_3$ | $-CH_3$ | 70 | 11 | 19 | 68000 |
| B-4 | $CH_3$ | 4 | $CH_3$ | $CH_3$ | $-CH_2(CH_2)_3$ | 70 | 7 | 23 | 72000 |
| B-5 | H | 5 | H | H | $-CH_3$ | 70 | 10 | 20 | 86000 |
| B-6 | H | 5 | H | H | $-CH_2CH(CH_3)CH_3$ | 70 | 2 | 28 | 42000 |
| B-7 | $CH_3$ | 1 | $CH_3$ | $CH_3$ | $-CH_2CH_3$ | 50 | 11 | 39 | 44500 |
| B-8 | $CH_3$ | 1 | $CH_3$ | $CH_3$ | $-CH_2CH_3$ | 50 | 10 | 40 | 51200 |
| B-9 | H | 1 | H | H | $-CH_2CH_3$ | 45 | 11 | 44 | 48900 |
| B-10 | H | 1 | $CH_3$ | $CH_3$ | $-CH_2CH_3$ | 45 | 12 | 43 | 43600 |

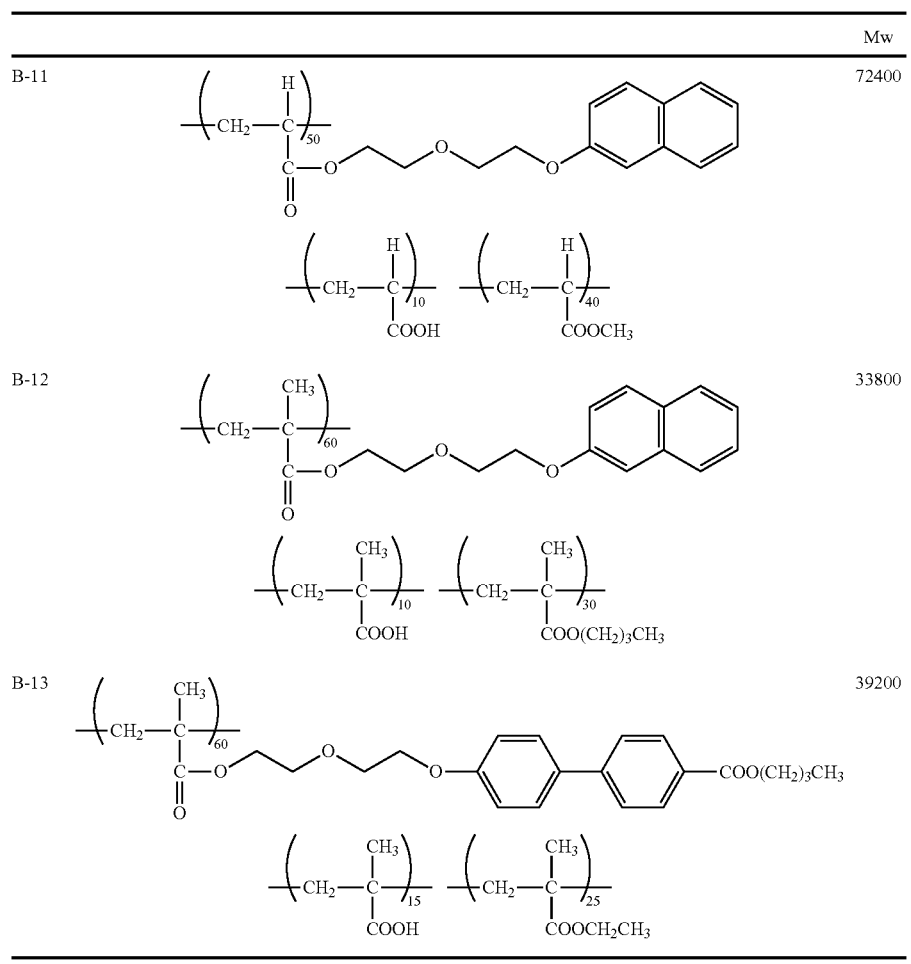

<Pigment>

The pigment used in the exemplary embodiment of the invention is not particularly limited, and may be appropriately selected according to the intended use. The pigment includes an organic pigment and an inorganic pigment.

Examples of the organic pigment include azo pigments, polycyclic pigments, dye chelates, nitro pigments, nitroso pigments, and aniline black. Among them, azo pigments and polycyclic pigments are more preferable.

Examples of the azo pigments include azo lakes, insoluble azo pigments, condensed azo pigments, and chelate azo pigments.

Examples of the polycyclic pigment include phthalocyanine pigments, perylene pigments, perinone pigments, anthraquinone pigments, quinacridone pigments, dioxazine pigments, indigo pigments, thioindigo pigments, isoindolinone pigments, and quinophthalone pigments.

Examples of the dye chelates include basic dye chelates and acidic dye chelates.

Examples of the inorganic pigments include titanium oxide, iron oxide, calcium carbonate, barium sulfate, aluminium hydroxide, barium yellow, cadmium red, chrome yellow, and carbon black. Among them, carbon black is particularly preferable. Carbon black may be produced by a known method such as a contact method, a furnace method, or a thermal method.

These pigments may be used alone or in a combination of two or more of them selected from one or more groups above.

The mass ratio (p:r) between the pigment (p) and the water-insoluble resin (r) in exemplary embodiments of the invention is preferably from 100:25 to 100:140, and more preferably from 100:25 to 100:50. When the proportion of the water-insoluble resin is 25 or more, dispersion stability and rub resistance tend to improve, and when 140 or less, dispersion stability tends to improve.

The resin-coated pigment (capsulated pigment) in exemplary embodiments of the invention may be produced using a water-insoluble resin and a pigment by a known physical or chemical method such as that described in JP-A Nos. 9-151342, 10-140065, 11-209672, 11-172180, 10-25440, and 11-43636. Specific examples of the method include the phase inversion method and acid precipitation method described in JP-A Nos. 9-151342 and 10-140065. Of these methods, the phase inversion method is preferable from the viewpoint of dispersion stability.

Basically, the phase inversion method is a self dispersion (phase inversion emulsification) method including dispersing in water a mixed melt of a pigment and a resin having self dispersibility or solubility. The mixed melt may contain a curing agent or a polymer compound. The mixed melt refers to a state where undissolved components are mixed and/or a state where dissolved components are mixed. Details about the "phase inversion method" are described in JP-A No. 10-140065.

In the ink composition in exemplary embodiments of the invention, the resin-coated pigment is preferably prepared using the water-insoluble resin through a preparation method of preparing a dispersion of the resin-coated pigment including, for example, the following steps (1) and (2). The ink composition in exemplary embodiments of the invention may be prepared by preparing a dispersion of the resin-coated pigment in accordance with the above-described preparation method, followed by preparing an ink composition from the obtained dispersion of the resin-coated pigment, water, and a hydrophilic organic solvent.

Step (1): a mixture containing a water-insoluble resin including the repeating unit having an acidic group, an organic solvent, a neutralizing agent, a pigment, and water is dispersed with a stirrer or the like to obtain a dispersion.

Step (2): at least a part of the organic solvent is removed from the dispersion.

The stirring method is not particularly limited, and may use a common mixing stirrer or, if necessary, a disperser such as an ultrasonic disperser, a high-pressure homogenizer, or a bead mill.

Examples of the organic solvent preferable herein include alcohol solvents, ketone solvents, and ether solvents. Examples of the alcohol solvents include isopropyl alcohol, n-butanol, t-butanol, and ethanol. Examples of the ketone solvents include acetone, methyl ethyl ketone, diethyl ketone, and methyl isobutyl ketone. Examples of the ether solvents include dibutyl ether and dioxane. Among these solvents, ketone solvents such as methyl ethyl ketone and alcohol solvents such as isopropyl alcohol are preferable, and methyl ethyl ketone is more preferable.

The neutralizing agent may be preferably used in the process (1) for neutralizing a part or all of the acidic groups so that the water-insoluble resin can form a stable emulsion or dispersion in water. Examples of the neutralizing agent include alcohol amines (such as diethanolamine, triethanolamine, and 2-amino-2-ethyl-1,3-propanediol), alkali metal hydroxides (such as lithium hydroxide, sodium hydroxide, and potassium hydroxide), ammonium hydroxide (such as ammonium hydroxide and quaternary ammonium hydroxide), phosphonium hydroxides, and alkali metal carbonates. Among them, sodium hydroxide and potassium hydroxide may be preferably used.

The water-insoluble resin may have a neutralization degree of from 70% to 95%. When the neutralization degree is 70% or higher, generation of white spots in an image formed from the ink may be suppressed. When the neutralization degree is 95% or lower, rub resistance of an image formed from the ink may be improved.

The neutralization degree may be preferably from 70% to 90%, and more preferably from 75% to 90%. By adjusting the neutralization degree within the above range, generation of white spots in an image formed from the ink may be effectively suppressed, and rub resistance of an image formed from the ink may be effectively improved.

The "neutralization degree" herein referred is a ratio (%) of an equivalent of a neutralizer with respect to one equivalent of the acid group. Namely, the neutralization degree of the water-insoluble resin is defined as a ratio of the total equivalence of the neutralizer to the total equivalence of the acid group contained in the water-insoluble resin, and is obtained in accordance with the following equality.

Neutralization degree of water-insoluble resin=(total equivalence of neutralizer)/total equivalence of acid group in water-insoluble resin)×100(%)

In the process (2), the organic solvent is evaporated from the dispersion prepared in the process (1) by a common procedure such as vacuum distillation to convert the phase into a water system, thereby obtaining a dispersion of resin-coated pigment particles, the particle surface of the pigment being coated with the water-insoluble resin. The obtained dispersion is substantially free from the organic solvent. The amount of the organic solvent may be preferably 0.2% by mass or less, and more preferably 0.1% by mass or less.

More specifically, the method for forming the dispersion of the water-insoluble resin may include: (1) mixing an acid group-containing water-insoluble resin or its solution in an organic solvent with a basic compound (neutralizing agent), thereby carrying out neutralization; (2) mixing the obtained mixed solution with a pigment to make a suspension, and then subjecting the suspension to dispersing by using a disperser or the like to obtain a pigment dispersion; and (3) removing the organic solvent by, for example, distillation, thereby coating the pigment with a water-insoluble resin having a structural unit having an acid group, and dispersing the coated pigment particles in an aqueous medium to provide an aqueous dispersion.

The method is further specifically described in JP-A Nos. 11-209672 and 11-172180.

The dispersing may be carried out by using, for example, a ball mill, a roll mill, a bead mill, a high-pressure homogenizer, a high-speed stirring disperser, or an ultrasonic homogenizer.

The average particle diameter of the pigment covered with the water-insoluble resin may be preferably in the range of 10 nm to 200 nm, more preferably in the range of 10 nm to 150 nm, and even more preferably in the range of 10 nm to 100 nm. When the average particle diameter is 200 nm or less, the color reproducibility and dotting property of the ink under inkjet recording system may become favorable. When the average particle diameter is 10 nm or more, light fastness may become favorable.

There is no particular limitation to the particle size distribution of the pigment covered with the water-insoluble resin. The polymer particles may have either a broad particle size distribution or a monodisperse particle size distribution. Two or more colored particles, each of which having a monodisperse particle size distribution, may be used in combination as a mixture.

The average particle diameter and the particle size distribution of the pigment covered with the water-insoluble resin may be measured by, for example, the dynamic light scattering method.

The pigment covered with the water-insoluble resin may be used singly or in a combination of two or more thereof.

From the viewpoint of the density of an image formed from the ink composition, the content of the pigment covered with the water-insoluble resin in the ink composition may be preferably from 0.1% by mass to 25% by mass, more preferably from 1% by mass to 20% by mass, even more preferably from 1.5% by mass to 15% by mass, and further preferably from 1.5% by mass to 10% by mass, with respect to the total amount of the ink composition.

The ratio of the content of colloidal silica to the content of the water-insoluble resin (colloidal silica/water-insoluble resin) in the ink composition may be preferably from 0.0001 to 0.5, more preferably from 0.0001 to 0.3, and even more preferably from 0.001 to 0.05, in terms of mass.

In embodiments which may be preferable in view of ink ejection reliability, rub resistance of an image formed from the ink composition, and suppression of deterioration of the liquid-repellency of the inkjet head member, the water-insoluble resin may have an acid value of from 30 mgKOH/g to 100 mgKOH/g, the colloidal silica may have a volume-average particle diameter of from 3 nm to 50 nm, and the ratio of the content of colloidal silica to the content of the water-insoluble resin (colloidal silica/water-insoluble resin) may be from 0.0001 to 0.3; and in more preferable embodiments, in the ink composition, the water-insoluble resin may have an acid value of from 50 mgKOH/g to 85 mgKOH/g, the colloidal silica may have a volume-average particle diameter of from 3 nm to 25 nm, and the ratio of the content of colloidal silica to the content of the water-insoluble resin (colloidal silica/water-insoluble resin) may be from 0.001 to 0.05.

[Hydrophilic Organic Solvent]

The ink composition for ink-jet recording in exemplary embodiments of the invention preferably includes a water-based medium. The water-based medium contains at least water as a solvent, but preferably contains water and at least one hydrophilic organic solvent. The hydrophilic organic solvent is used for the purpose of an anti-drying agent, a wetting agent, or a penetration promoting agent.

An anti-drying agent or a wetting agent is used for the purpose of preventing the clogging caused as the ink for ink-jet recording dries up at the ink spray orifice of a nozzle. The anti-drying agent or wetting agent is preferably a hydrophilic organic solvent having a lower vapor pressure than water.

Furthermore, for the purpose of making the ink composition for ink-jet recording penetrate easily into paper, a hydrophilic organic solvent is suitably used as a penetration promoting agent.

The ink composition for ink-jet recording in exemplary embodiments of the invention preferably includes at least one type of a first hydrophilic organic solvent having an I/O value of from 0.70 to less than 1.0. When the I/O value of the first hydrophilic organic solvent is less than 1.00, compatibility with the self-dispersing polymer particles is enhanced, the fixability of the images formed is more effectively enhanced, and the rub resistance of the images is further enhanced. When the I/O value of the first hydrophilic organic solvent is 0.70 or more, the stability of the ink composition is enhanced.

The I/O value of the hydrophilic organic solvent has the same definition as that in the self-dispersing polymer which is described below, and is calculated in a manner substantially similar to that in the calculation of the I/O value for the self-dispersing polymer.

It is preferable that the ink composition for ink-jet recording in exemplary embodiments of the invention further includes at least one of a second hydrophilic organic solvent having an I/O value of 1.00 to 1.50, in addition to the first hydrophilic organic solvent. When the I/O value of the second hydrophilic organic solvent is 1.00 or more, the stability of the ink composition is more effectively enhanced. When the I/O value of the second hydrophilic organic solvent is 1.50 or less, deterioration of the fixation properties of the formed images can be suppressed.

Specific examples of the first hydrophilic organic solvent having an I/O value of 0.70 or more and less than 1.00 include glycol ethers. Propylene glycol ether or ethylene glycol ether is preferable, and propylene glycol ether is more preferable. Specific examples include triprolene glycol monomethyl ether (I/O value: 0.80), triprolene glycol monoethyl ether (I/O value: 0.73), triprolene glycol monobutyl ether (I/O value: 0.61), diprolene glycol monoethyl ether (I/O value: 0.78), diprolene glycol monobutyl ether (I/O value: 0.70), and prolene glycol monobutyl ether (I/O value: 0.88).

Among these, triprolene glycol monomethyl ether (I/O value: 0.80) is preferable from the viewpoints of image fixability and ink stability.

Specific examples of the second hydrophilic organic solvent having an I/O value of 1.0 to 1.5, include propylene glycol monomethyl ether (I/O value: 1.50), propylene glycol monoethyl ether (I/O value: 1.20), diethylene glycol monobutyl ether (I/O value: 1.40), triethylene glycol monobutyl ether (I/O value: 1.20), 2,2-diethyl-1,3-propanediol (I/O value: 1.43), 2-methyl-2-propyl-1,3-propanediol (I/O value: 1.43), 2,4-dimethyl-2,4-pentanediol (I/O value: 1.43), 2,5-dimethyl-2,5-hexanediol (I/O value: 1.25), tripropylene glycol (I/O value: 1.33), SANNIX GP250 (trade name, I/O value: 1.30, manufactured by Sanyo Chemical Industries, Ltd.), and the like. Among them, SANNIX GP250 is preferable from the viewpoints of image fix properties and ink stability.

The content of the first hydrophilic organic solvent in the ink composition for ink-jet recording in exemplary embodiments of the invention is preferably 0.1% by mass to 20% by mass, more preferably 1% by mass to 16% by mass, and further preferably 2% by mass to 12% by mass, from the viewpoints of image fix properties and ink stability.

Furthermore, it is preferable that the ink composition includes, as the first hydrophilic organic solvent, a hydrophilic organic solvent whose I/O value is selected from the range of 0.70 or more and less than 1.00, in an amount of 1 to 16% by mass, and it is more preferable that the ink composition includes a hydrophilic organic solvent whose I/O value is selected from the range of 0.70 or more and less than 0.90, in an amount of 2% by mass to 12% by mass.

The content of the second hydrophilic organic solvent in the ink composition for ink-jet recording in exemplary embodiments of the invention is preferably 0.1% by mass to 20% by mass, more preferably 1% by mass to 16% by mass, and further preferably 2% by mass to 12% by mass, from the viewpoints of image fix properties and ink stability.

Furthermore, it is preferable that the ink composition includes, as the second hydrophilic organic solvent, a hydrophilic organic solvent whose I/O value is selected from the range of 1.00 to 1.50, in an amount of 1% by mass to 16% by mass, and it is more preferable that the ink composition includes a hydrophilic organic solvent whose I/O value is selected from the range of 1.20 to 1.40, in an amount of 2% by mass to 12% by mass.

Furthermore, the content ratio of the second hydrophilic organic solvent to the first hydrophilic organic solvent in the ink composition for ink-jet recording in exemplary embodiments of the invention (second hydrophilic organic solvent/first hydrophilic organic solvent) is preferably 1/10 to 10/1, more preferably 1/4 to 4/1, and further preferably 1/2 to 2/1, from the viewpoints of image fix properties and ink stability.

The ink composition for ink-jet recording in exemplary embodiments of the invention may further include another hydrophilic organic solvent, in addition to the first hydrophilic organic solvent and the second hydrophilic organic solvent. As for the other hydrophilic organic solvent, polyhydric alcohols are useful for the purpose of functioning as an anti-drying agent or a wetting agent, and examples include glycerin (I/O value: 5.00), ethylene glycol (I/O value: 2.00), diethylene glycol (I/O value: 5.00), triethylene glycol (I/O value: 3.43), propylene glycol (I/O value: 2.50), dipropylene glycol (I/O value: 2.00), 1,3-butanediol (I/O value: 2.50), 2,3-butanediol (I/O value: 2.50), 1,4-butanediol (I/O value: 2.50), 3-methyl-1,3-butanediol (I/O value: 2.00), 1,5-pentanediol (I/O value: 2.00), tetraethylene glycol (I/O value: 2.91), 1,6-hexanediol (I/O value: 1.67), 2-methyl-2,4-pentanediol (I/O value: 1.67), polyethylene glycol (I/O value depends on the number of repetition of the ethylene chain), 1,2,4-butanetriol (I/O value: 3.75), 1,2,6-hexanetriol (I/O value: 2.50), and the like. These may be used individually, or may be used in combination of two or more types.

For the purpose of functioning as a permeation agent, a polyol compound is preferable, and preferable examples of aliphatic diol include 2-ethyl-2-methyl-1,3-propanediol (I/O value: 1.67), 3,3-dimethyl-1,2-butanediol (I/O value: 1.67), 5-hexene-1,2-diol, 2-ethyl-1,3-hexanediol (I/O value: 2.00), and 2,2,4-trimethyl-1,3-pentanediol (I/O value: 1.88).

The content of the other hydrophilic organic solvent may be, for example, 16% by mass or less, and is preferably 12% by mass or less, and more preferably 8% by mass or less.

The hydrophilic organic solvent in the ink composition for ink-jet recording in exemplary embodiments of the invention may be used individually, or may be used as mixtures of two or more types. The content of the hydrophilic organic solvent is preferably 1% by mass to 60% by mass, more preferably 5% by mass to 40% by mass, and particularly preferably 10% by mass to 30% by mass, from the viewpoints of stability and ejection properties.

The amount of addition of water used in exemplary embodiments of the invention is not particularly limited, but the amount is preferably 10% by mass to 99% by mass, more preferably 30% by mass to 80% by mass, and further preferably 50% by mass to 70% by mass, in the ink composition for ink-jet recording, from the viewpoints of securing stability and ejection reliability.

An ink composition according to exemplary embodiments of the invention preferably includes at least one kind of resin particles from viewpoints of fixability of images formed, rub resistance of the images, and aggregation property of the ink composition. Further, the resin particle is preferably a particle of a self-dispersing polymer from viewpoint of dispersion stability of the particle in the ink composition.

The self-dispersing polymer according to exemplary embodiments of the invention means a water-insoluble polymer which can be in a dispersed state in an aqueous medium due to the functional group (particularly, an acidic group or a salt thereof) of the polymer itself when brought to a dispersed state by an phase inversion emulsification method in the absence of a surfactant.

Here, the term dispersed state includes both an emulsified state (emulsion) in which a water-insoluble polymer is dispersed in an aqueous medium in the liquid state, and a dispersed state (suspension) in which a water-insoluble polymer is dispersed in an aqueous medium in the solid state.

In regard to the self-dispersing polymer according to exemplary embodiments of the invention, it is preferable that the water-insoluble polymer is a self-dispersing polymer capable of being in a dispersed state in the solid state, from the viewpoint of ink fixation properties obtainable when incorporated in an ink composition.

The method for preparing the emulsified or dispersed state of the self-dispersing polymer, that is, an aqueous dispersion of the self-dispersing polymer, may be a phase inversion emulsification method. The phase inversion emulsification method may be, for example, a method of dissolving or dispersing the self-dispersing polymer into a solvent (for example, a hydrophilic organic solvent or the like), subsequently introducing the solution or dispersion directly into water without adding a surfactant, mixing under stirring the system while a salt-producing group (for example, an acidic group) carried by the self-dispersing polymer is neutralized, removing the solvent, and then obtaining an aqueous dispersion that has been brought to an emulsified or dispersed state.

A stable emulsified or dispersed state for the self-dispersing polymer in exemplary embodiments of the invention means that even when a solution prepared by dissolving 30 g of a water-insoluble polymer in 70 g of an organic solvent (for example, methyl ethyl ketone), a neutralizing agent capable of neutralizing 100% of the salt-producing group of the water-insoluble polymer (if the salt-producing group is anionic, sodium hydroxide, and if the salt-producing group is cationic, acetic acid), and 200 g of water are mixed and stirred (apparatus: a stirring apparatus equipped with a stirring blade, speed of rotation 200 rpm, for 30 minutes, 25° C.), and then the organic solvent is removed from the liquid mixture, the emulsified or dispersed state remains stable for at least one week at 25° C., so that the generation of precipitates cannot be verified by visual inspection.

The stability of the emulsified or dispersed state for the self-dispersing polymer can be confirmed by a precipitation acceleration test based on centrifugation. The stability obtained by a precipitation acceleration test based on centrifugation can be evaluated by, for example, adjusting the aqueous dispersion of the polymer particles obtained by the method described above to a solids concentration of 25% by mass, subsequently centrifuging the dispersion for one hour at 12,000 rpm, and measuring the solids concentration of the supernatant obtained after centrifugation.

When the ratio of the solids concentration after centrifugation to the solids concentration before centrifugation is large (a value close to 1), it means that precipitation of the polymer particles resulting from centrifugation does not occur, that is, the aqueous dispersion of the polymer particles is more stable. According to the present invention, the ratio of the solids concentration before and after centrifugation is preferably 0.8 or greater, more preferably 0.9 or greater, and particularly preferably 0.95 or greater.

Further, the water-insoluble polymer means a polymer showing an amount of dissolution of 10 g or less when the polymer is dried at 105° C. for 2 hr and then dissolved in 100 g of water at 25° C. The amount of dissolution is, preferably, 5 g or less and, more preferably, 1 g or less. The amount of dissolution is the amount of dissolution when the polymer is neutralized with sodium hydroxide or acetic acid to 100% in accordance with the kind of the salt-forming group of the water-insoluble polymer.

The self-dispersing polymer according to exemplary embodiments of the invention is such that the content of the water-soluble component exhibiting water-solubility when brought to a dispersed state is preferably 10% by mass or less, more preferably 8% by mass or less, and even more preferably 6% by mass or less. When the water-soluble component is 10% by mass or less, swelling of the polymer particles or fusion of the polymer particles is effectively suppressed, and a more stable dispersed state can be maintained. Viscosity increase of the ink composition can also be suppressed, and the ejection stability becomes better.

Here, the water-soluble component means a compound contained in the self-dispersing polymer, where the compound dissolves in water when the self-dispersing polymer is brought to a dispersed state. The water-soluble component is a water-soluble compound that is side-produced or incorporated during the production of the self-dispersing polymer.

The self-dispersing polymer according to exemplary embodiments of the invention includes at least one hydrophilic constituent unit derived from a hydrophilic monomer, and at least one hydrophobic constituent unit derived from a hydrophobic monomer. The main chain skeleton of the self-dispersing polymer is not particularly limited, but from the viewpoint of the dispersion stability of the polymer particles, the main chain skeleton is preferably a vinyl polymer, and preferably a (meth)acrylic polymer. Here, the (meth)acrylic polymer means a polymer including at least one of a constituent unit derived from a methacrylic acid derivative and a constituent unit derived from an acrylic acid derivative.

(Hydrophilic Constituent Unit)

The hydrophilic constituent unit in the self-dispersing polymer is not particularly limited so long as it is derived from a hydrophilic group-containing monomer and it may be either a unit derived from one hydrophilic group-containing monomer (hydrophilic monomer) or a unit derived from two or more hydrophilic group-containing monomers. The hydrophilic group is not particularly limited and it may be either a dissociative group or a nonionic hydrophilic group.

The hydrophilic group is preferably a dissociative group from the viewpoints of promoting the self-dispersibility and stability of the formed emulsified or dispersed state and, more preferably, an anionic dissociative group. Examples of the dissociative group include a carboxy group, a phosphoric acid group, and a sulfonic acid group and, among them, a carboxy group is preferred from the viewpoint of the fixing property when used in the ink composition.

The hydrophilic group-containing monomer is preferably a dissociative group-containing monomer and, preferably, a dissociative group-containing monomer having a dissociative group and an ethylenically unsaturated bond from the viewpoint of self-dispersibility.

Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-(methacryloyloxy) methyl succinicate, etc. Specific examples of the unsaturated sulfonic acid monomer include styrenesulfonic acid, 2-acrylamido-2-methylpropanesulfonic acid, 3-sulfopropyl(meth)acrylate, and bis(3-sulfopropyl) itaconate. Specific examples of the unsaturated phosphoric acid monomer include vinylphosphonic acid, vinylphosphate, bis(methacryloyloxyethyl) phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, an unsaturated carboxylic acid monomer is preferred and, at least one kind of acrylic acid and methacrylic acid is more preferred from the viewpoints of the dispersion stability and ejection stability.

Examples of the monomer having a nonionic hydrophilic group include ethylenically unsaturated monomers containing a (poly)ethyleneoxy group or a polypropyleneoxy group, such as 2-methoxyethyl acrylate, 2-(2-methoxyethoxy)ethyl acrylate, 2-(2-methoxyethoxy)ethyl methacrylate, ethoxytriethylene glycol methacrylate, methoxypolyethylene glycol (molecular weight 200 to 1000) monomethacrylate, and polyethylene glycol (molecular weight 200 to 1000) monomethacrylate; and ethylenically unsaturated monomers having a hydroxyl group, such as hydroxymethyl(meth)acrylate, 2-hydroxyethyl(meth)acrylate, 2-hydroxypropyl(meth)acrylate, 4-hydroxybutyl(meth)acrylate, and hydroxypentyl(meth)acrylate, hydroxyhexyl(meth)acrylate.

The monomer having a nonionic hydrophilic group is preferably an ethylenically unsaturated monomer having an alkyl ether at the end, rather than an ethylenically unsaturated monomer having a hydroxyl group at the end, from the viewpoints of the stability of the particles and the content of the water-soluble component.

The hydrophilic constituent unit in the self-dispersing polymer is preferably any of an embodiment containing only a hydrophilic constituent unit having an anionic dissociative group, and an embodiment containing both a hydrophilic constituent unit having an anionic dissociative group and a hydrophilic constituent unit having a nonionic hydrophilic group.

Furthermore, an embodiment containing two or more types of hydrophilic constituent units having an anionic dissociative group, or an embodiment having two or more of a hydrophilic constituent unit having an anionic dissociative group and a hydrophilic constituent unit having a nonionic hydrophilic group in combination, is also preferable.

The content of the hydrophilic constituent unit in the self-dispersing polymer is preferably 25% by mass or less, more preferably from 1 to 25% by mass, further preferably from 2 to 23% by mass, and particularly preferably from 4 to 20% by mass, from the viewpoints of viscosity and stability over time.

When the polymer has two or more types of hydrophilic constituent units, it is preferable that the total content of the hydrophilic constituent unit is within the range described above.

The content of the hydrophilic constituent unit having an anionic dissociative group in the self-dispersing polymer is preferably in the range such that the acid value falls in the suitable range described below.

The content of the constituent unit having a nonionic hydrophilic group is preferably from 0% by mass to 25% by mass, more preferably from 0% by mass to 20% by mass, and particularly preferably from 0% by mass to 15% by mass, from the viewpoints of ejection stability and stability over time.

When the self-dispersing polymer has an anionic dissociative group, the acid value (mg KOH/g) is preferably 20 to 200, more preferably 22 to 120, and particularly preferably 25 to 100, from the viewpoint of self-dispersibility, content of the water-soluble component, and fixation properties when the polymer constitutes an ink composition. The acid value is particularly preferably 30 to 80. When the acid value is 20 or greater, the particles can be dispersed more stably, and when the acid value is 200 or less, the content of the water-soluble component can be reduced.

(Hydrophobic Constituent Unit)

The hydrophobic constituent unit in the self-dispersing polymer is not particularly limited so long as it is derived from a hydrophobic group-containing monomer (hydrophobic monomer), and may be a constituent unit derived from a monomer containing one type of hydrophobic group, or may be a constituent unit derived from a monomer containing two or more types of hydrophobic groups. The hydrophobic group is not particularly limited, and may be any of a chain-like aliphatic group, a cyclic aliphatic group, and an aromatic group.

The hydrophobic monomer is preferably such that at least one is a cyclic aliphatic group-containing monomer, and more preferably a cyclic aliphatic group-containing (meth)acrylate (hereinafter, may be referred to as "alicyclic(meth)acrylate"), from the viewpoints of blocking resistance, rub resistance and dispersion stability.

—Alicyclic(meth)acrylate—

The alicyclic(meth)acrylate is a compound including a structural site derived from (meth)acrylic acid and a structural site derived from alcohol, and having a structure containing at least one unsubstituted or substituted alicyclic hydrocarbon group (cyclic aliphatic group) in the structural site derived from alcohol. The alicyclic hydrocarbon group may be the structural site derived from alcohol itself, or may be linked to the structural site derived from alcohol via a linking group.

The "alicyclic(meth)acrylate" means a methacrylate or acrylate having an alicyclic hydrocarbon group.

The alicyclic hydrocarbon group is not particularly limited so long as it contains a cyclic non-aromatic hydrocarbon group, and may be a monocyclic hydrocarbon group, a bicyclic hydrocarbon group, or a polycyclic hydrocarbon group having three or more rings.

Examples of the alicyclic hydrocarbon group include a cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo[5.2.1.0$^{2,6}$]decanyl group, a bicyclo[4.3.0]nonane, and the like.

The alicyclic hydrocarbon group may be further substituted with a substituent. Examples of the substituent include an alkyl group, an alkenyl group, an aryl group, an aralkyl group, an alkoxy group, a hydroxyl group, a primary amino group, a secondary amino group, a tertiary amino group, an alkyl- or arylcarbonyl group, a cyano group, and the like.

The alicyclic hydrocarbon group may further form a condensed ring.

The alicyclic hydrocarbon group according to exemplary embodiments of the invention preferably has 5 to 20 carbon atoms in the alicyclic hydrocarbon group moiety, from the viewpoint of viscosity or solubility.

The linking group that links the alicyclic hydrocarbon group and the structural site derived from alcohol may be suitably an alkylene group, an alkenylene group, an alkynylene group, an aralkylene group, an alkylenoxy group, a mono- or oligoethylenoxy group, a mono- or oligopropylenoxy group, or the like, having 1 to 20 carbon atoms.

Specific examples of the alicyclic(meth)acrylate according to exemplary embodiments of the invention will be shown below, but the invention is not limited to these.

Examples of monocyclic(meth)acrylate include cycloalkyl (meth)acrylates having a cycloalkyl group having 3 to 10 carbon atoms, such as cyclopropyl(meth)acrylate, cyclobutyl (meth)acrylate, cyclopentyl(meth)acrylate, cyclohexyl (meth)acrylate, cycloheptyl(meth)acrylate, cyclooctyl(meth) acrylate, cyclononyl(meth)acrylate, and cyclodecyl(meth) acrylate.

Examples of bicyclic(meth)acrylate include isobornyl (meth)acrylate, norbornyl(meth)acrylate, and the like.

Examples of tricyclic(meth)acrylate include adamantyl (meth)acrylate, dicyclopentanyl(meth)acrylate, dicyclopentenyloxyethyl(meth)acrylate, and the like.

These can be used individually, or as mixtures of two or more types.

Among these, at least one of the bicyclic(meth)acrylate and the polycyclic(meth)acrylate having three or more rings is preferable, and at least one selected from isobornyl(meth) acrylate, adamantyl(meth)acrylate and dicyclopentanyl (meth)acrylate is more preferable, from the viewpoints of the dispersion stability of the self-dispersing polymer particles, and fixability and blocking resistance of an image formed.

According to exemplary embodiments of the invention, the content of the constituent unit derived from alicyclic(meth) acrylate contained in the self-dispersing polymer particles is preferably 20% by mass to 90% by mass, more preferably 40% by mass to 90% by mass, and particularly preferably 50% by mass to 80% by mass, from the viewpoints of the stability of the self-dispersed state, stabilization of particle shape in an aqueous medium due to the hydrophobic interaction between the alicyclic hydrocarbon groups, and a decrease in the amount of the water-soluble component due to an appropriate hydrophobization of particles.

When the content of the constituent unit derived from alicyclic(meth)acrylate is 20% by mass or more, fixation properties and blocking can be improved. On the other hand, when the content of the constituent unit derived from alicyclic (meth)acrylate is 90% by mass or less, the stability of the polymer particles is improved.

The self dispersing polymer according to exemplary embodiments of the invention can be constituted to further include another constituent unit as the hydrophobic constituent unit if necessary, in addition to the constituent unit derived from alicyclic(meth)acrylate. The monomer forming the other constituent unit is not particularly limited so long as it is a monomer capable of copolymerizing with the alicyclic (meth)acrylate and the hydrophilic group-containing monomer, and any known monomer can be used.

Specific examples of the monomer forming the other constituent unit (hereinafter, may be referred to as "other copolymerizable monomer") include alkyl(meth)acrylates such as methyl(meth)acrylate, ethyl(meth)acrylate, isopropyl(meth) acrylate, n-propyl(meth)acrylate, n-butyl(meth)acrylate, isobutyl(meth)acrylate, t-butyl(meth)acrylate, hexyl(meth) acrylate, and ethylhexyl(meth)acrylate; aromatic ring-containing (meth)acrylates such as benzyl(meth)acrylate and phenoxyethyl(meth)acrylate; stryrenes such as styrene, α-methylstyrene, and chlorostyrene; dialkylaminoalkyl (meth)acrylates such as dimethylaminoethyl(meth)acrylate; N-hydroxyalkyl(meth)acrylamides such as N-hydroxymethyl(meth)acrylamide, N-hydroxyethyl(meth)acrylamide, and N-hydroxybutyl(meth)acrylamide; N-alkoxyalkyl(meth) acrylamides such as N-methoxymethyl(meth)acrylamide, N-ethoxymethyl(meth)acrylamide, N-(n-, iso-)butoxymethyl(meth)acrylamide, N-methoxyethyl(meth)acrylamide, N-ethoxyethyl(meth)acrylamide, and N-(n-, iso-)butoxyethyl(meth)acrylamide; and the like.

Among them, the other constituent unit is preferably at least one (meth)acrylate containing a chain-like alkyl group having 1 to 8 carbon atoms, from the viewpoint of the flexibility of the polymer skeleton or the ease of control of the glass transition temperature (Tg) and from the viewpoint of the dispersion stability of the self-dispersing polymer, and is more preferably a (meth)acrylate having a chain-like alkyl group having 1 to 4 carbon atoms, and particularly preferably methyl(meth)acrylate or ethyl(meth)acrylate. Here, the chain-like alkyl group refers to an alkyl group having a linear or branched chain.

According to exemplary embodiments of the invention, a (meth)acrylate containing an aromatic group can also be preferably used.

When an aromatic-containing (meth)acrylate is contained as the other copolymerizable monomer, the content of the constituent unit derived from the aromatic-containing (meth) acrylate is preferably 40% by mass or less, more preferably 30% by mass or less, and particularly preferably 20% by mass or less, from the viewpoint of the dispersion stability of the self-dispersing polymer particles.

Furthermore, when a styrene-type monomer is used as the other copolymerizable monomer, the content of the constituent unit derived from the styrene-type monomer is preferably 20% by mass or less, more preferably 10% by mass or less, and further preferably 5% by mass or less, from the viewpoint of stability when the self-dispersing polymer is made into particles, and it is particularly preferable that the polymer does not include a constituent unit derived from a styrene-type monomer.

Here, the styrene-type monomer refers to styrene, substituted styrene α-methylstyrene, chlorostyrene, or the like), or a styrene macromer having a polystyrene structural unit.

The other copolymerizable monomer in the self-dispersing polymer may be used individually, or in combination of two or more types.

When the self-dispersing polymer includes the other constituent unit, the content is preferably from 10% by mass to 80% by mass, more preferably from 15% by mass to 75% by mass, and particularly preferably from 20% by mass to 70% by mass. When two or more types of the monomer forming the other constituent unit are used in combination, the total content is preferably in the range mentioned above.

The self-dispersing polymer according to exemplary embodiments of the invention is preferably a polymer obtainable by polymerizing at least three types of an alicyclic(meth)acrylate, another copolymerizable monomer and a hydrophilic group-containing monomer, and more preferably a polymer obtainable by polymerizing at least three types of an alicyclic(meth)acrylate, an alkyl group-containing (meth)acrylate having a linear or branched chain having 1 to 8 carbon atoms, and a hydrophilic group-containing monomer, from the viewpoint of dispersion stability.

According to exemplary embodiments of the invention, it is preferable that the content of the (meth)acrylate having a linear or branched alkyl group having 9 or more carbon atoms, and the constituent unit having a substituent with high hydrophobicity, which is derived from an aromatic group-containing macromonomer or the like, is substantially none, and it is more preferable that the polymer does not include any of the constituent units at all, from the viewpoint of dispersion stability.

The self-dispersing polymer according to exemplary embodiments of the invention may be a random copolymer having the respective constituent units introduced irregularly, or may be a block copolymer having the respective constituent units introduced regularly. If the first polymer is a block copolymer, the respective constituent units may be synthesized in a certain order of introduction, or the same constituent component may be used two or more times. However, it is preferable that the first polymer is a random copolymer, from the viewpoints of all-purpose usability and manufacturability.

The range of molecular weight of the self-dispersing polymer according to exemplary embodiments of the invention is preferably from 3000 to 200,000, more preferably from 10,000 to 200,000, and further preferably from 30,000 to 150,000, in terms of weight average molecular weight. When the weight average molecular weight is 3,000 or more, the amount of the water-soluble component can be effectively suppressed. When the weight average molecular weight is 200,000 or less, the self-dispersion stability can be enhanced.

Here, the weight average molecular weight can be measured by gel permeation chromatography (GPC).

From the viewpoint of controlling the hydrophilicity and hydrophobicity of the polymer, the self-dispersing polymer according to exemplary embodiments of the invention is preferably a vinyl polymer which includes a structure derived from an alicyclic(meth)acrylate at a copolymerization ratio of 20% by mass to 90% by mass, and at least one of a structure derived from a dissociative group-containing monomer and a structure derived from a (meth)acrylate containing a chain-like alkyl group having 1 to 8 carbon atoms, and has an acid value of from 20 to 120, a total content of the hydrophilic structural units of 25% by mass or less, and a weight average molecular weight of from 3,000 to 200,000.

The first polymer is more preferably a vinyl polymer which includes a structure derived from a bicyclic(meth)acrylate or a polycyclic(meth)acrylate having three or more rings at a copolymerization ratio of 20% by mass or more and less than 90% by mass, and a structure derived from a (meth)acrylate containing a chain-like alkyl group having 1 to 4 carbon atoms at a copolymerization ratio of 10% by mass or more and less than 80% by mass, and a structure derived from a carboxy group-containing monomer at an acid value in the range of 25 to 100, and has a total content of the hydrophilic structural unit of 25% by mass or less, and a weight average molecular weight of from 10,000 to 200,000.

Furthermore, the first polymer is particularly preferably a vinyl polymer which includes a structure derived from a bicyclic(meth)acrylate or a polycyclic(meth)acrylate having three or more rings at a copolymerization ratio of 40% by mass or more and less than 80% by mass, and at least a structure derived from methyl(meth)acrylate or ethyl(meth)acrylate at a copolymerization ratio of 20% by mass or more and less than 60% by mass, and a structure derived from acrylic acid or methacrylic acid at an acid value in the range of 30 to 80, and has a total content of the hydrophilic structural unit of 25% by mass or less, and a weight average molecular weight of from 30,000 to 150,000.

The glass transition temperature of the self-dispersing polymer is not particularly limited, but from the viewpoints of blocking resistance and rub resistance of images, the glass transition temperature is preferably from 150° C. to 250° C., and more preferably from 160° C. to 200° C.

If the glass transition temperature of the self-dispersing polymer is below 150° C., the blocking resistance (particularly, under the high temperature and high humidity conditions) may be decreased. When the glass transition temperature is 250° C. or lower, the rub resistance of images is enhanced.

The glass transition temperature of the self-dispersing polymer can be appropriately controlled according to methods conventionally used. For example, the glass transition temperature of the self-dispersing polymer can be controlled to a desired range by appropriately selecting the type of the polymerizable group of the monomer constituting the self-dispersing polymer, the type or the composition ratio of the substituent on the monomer, the molecular weight of the polymer molecule, or the like.

For the glass transition temperature (Tg) of the self-dispersing polymer according to exemplary embodiments of the invention, a measured Tg that is obtainable by actual measurement is applied. Specifically, the measured Tg means a value measured under conventional measurement conditions using a differential scanning calorimeter (DSC) EXSTAR6220(trade name) manufactured by SII Nanotechnology, Inc.

However, if measurement is difficult due to degradation of the polymer or the like, a calculated Tg that is computed by the following calculation formula, is applied.

The calculated Tg is calculated by the following formula (1):

$$1/Tg = \Sigma(X_i/Tg_i) \qquad (1)$$

Here, it is assumed that in the polymer serving as the object of calculation, n species of monomer components, with i being from 1 to n, are copolymerized. $X_i$ is the weight fraction of the $i^{th}$ monomer ($\Sigma X_i = 1$), and $Tg_i$ is the glass transition temperature (absolute temperature) of a homopolymer of the $i^{th}$ monomer, provided that $\Sigma$ takes the sum of i=1 to i=n. Furthermore, for the value of the glass transition temperature of a homopolymer of each monomer ($Tg_i$), the values given in Polymer Handbook ($3^{rd}$ edition) (J. Brandrup, E. H. Immergut, (Wiley-Interscience, 1989)) are employed.

The I/O value of the self-dispersing polymer is not particularly limited, but from the viewpoints of blocking resistance and the stability of the ink composition, the value is preferably from 0.20 to 0.55, more preferably from 0.30 to 0.54, and even more preferably from 0.40 to 0.50.

If the I/O value of the self-dispersing polymer is less than 0.20, the stability of the ink composition may be decreased. If the I/O value is greater than 0.55, blocking resistance (particularly, under high temperature and high humidity conditions) may be decreased.

The I/O value, which is also called as an inorganicity value/organicity value, is a value that deals with the polarity of various organic compounds in an organic conceptual manner, and is one of functional group contribution methods setting parameters to each functional group.

The I/O value is explained in detail in "Organic Conceptual Diagram" (by Koda Yoshio, published by Sankyo Publishing Co., Ltd. (1984) and the like. The concept of the I/O value is to indicate the result of dividing the properties of a compound into organic groups representing covalent bonding properties and inorganic groups representing ion bonding properties, and rating every organic compound as a point on a Cartesian coordinate system designated as an organic axis and an inorganic axis.

According to exemplary embodiments of the invention, a polymer having a desired I/O value can be constructed by appropriately adjusting the structure and content of the monomers constituting the self-dispersing polymer.

Hereinafter, specific examples of the self-dispersing polymer will be listed as exemplary compounds, but the present invention is not limited to these. The numbers in the parentheses represent the mass ratio of the copolymerized components.

Methyl methacrylate/isobornyl methacrylate/methacrylic acid copolymer (20/72/8), glass transition temperature: 180° C., I/O value: 0.44

Methyl methacrylate/isobornyl methacrylate/methacrylic acid copolymer (40/52/8), glass transition temperature: 160° C., I/O value: 0.50

Methyl methacrylate/isobornyl methacrylate/dicyclopentanyl methacrylate/methacrylic acid copolymer (20/62/10/8), glass transition temperature: 170° C., I/O value: 0.44

Methyl methacrylate/dicyclopentanyl methacrylate/methacrylic acid copolymer (20/72/8), glass transition temperature: 160° C., I/O value: 0.47

For the calculation of the I/O value, the following values were used as the I/O values of the monomers constituting the polymer.

Methyl methacrylate: 0.60, isobornyl methacrylate: 0.29, dicyclopentanyl methacrylate: 0.32, methacrylic acid 0.47

The method for producing a self-dispersing polymer according to exemplary embodiments of the invention is not particularly limited, and the polymer can be produced by copolymerizing a monomer mixture according to a known polymerization method. Among such polymerization methods, it is more preferable to perform polymerization in an organic medium from the viewpoint of droplet ejection properties when formed into an ink composition, and a solution polymerization method is particularly preferable.

In regard to the method for producing the self-dispersing polymer in exemplary embodiments of the invention, the water-insoluble polymer as described above can be produced by subjecting a mixture including a monomer mixture and if necessary, an organic solvent and a radical polymerization initiator, to a copolymerization reaction under an inert gas atmosphere.

The method for producing an aqueous dispersion of self-dispersing polymer particles according to exemplary embodiments of the invention is not particularly limited, and an aqueous dispersion of self-dispersing polymer particles can be obtained by a known method. The process of obtaining a self-dispersing polymer as an aqueous dispersion is preferably a phase inversion emulsification method including the following process (1) and process (2).

Process (1): a process of obtaining a dispersion by stirring a mixture containing a water-insoluble polymer, an organic solvent, a neutralizing agent and an aqueous medium.

Process (2): a process of removing at least a portion of the organic solvent from the dispersion.

The process (1) is preferably a treatment of first dissolving the water-insoluble polymer in an organic solvent, slowly adding a neutralizing agent and an aqueous medium thereto, and mixing and stirring the mixture to obtain a dispersion. As such, when a neutralizing agent and an aqueous medium are added into a solution of the water-insoluble polymer dissolved in an organic solvent, a self-dispersing polymer particle having a particle size with higher storage stability can be obtained without requiring a strong shear force.

The method of stirring the mixture is not particularly limited, and any generally used mixing and stirring apparatus, or if necessary, a dispersing machine such as an ultrasonic dispersing machine or a high pressure homogenizer can be used.

Preferable examples of the organic solvent include alcohol-based solvents, ketone-based solvents, and ether-based solvents.

Examples of the alcohol-based solvents include isopropyl alcohol, n-butanol, t-butanol, ethanol and the like. Examples of the ketone-based solvents include acetone, methyl ethyl ketone, diethyl ketone, methyl isobutyl ketone, and the like. Examples of the ether-based solvents include dibutyl ether, dioxane, and the like. Among these organic solvents, ketone-based solvents such as methyl ethyl ketone and alcohol-based solvents such as isopropyl alcohol are preferred.

It is also preferable to use isopropyl alcohol and methyl ethyl ketone in combination. When the solvents are used in combination, aggregation/precipitation or fusion between particles does not occur, and a self-dispersing polymer particle having a microparticle size with high dispersion stability can be obtained. This is thought to be because the polarity change upon phase inversion from an oil system to an aqueous system becomes mild.

The neutralizing agent is used to partially or entirely neutralize the dissociative groups so that the self-dispersing polymer can form a stable emulsified or dispersed state in water. In the case where the self-dispersing polymer in exemplary embodiments of the invention has an anionic dissociative group as the dissociative group, examples of the neutralizing agent to be used include basic compounds such as organic amine compounds, ammonia, and alkali metal hydroxides. Examples of the organic amine compounds include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-diethylamino-2-methyl-1-propanol, 2-amino-2-methyl-1-propanol, N-methyldiethanolamine, N-ethyldiethanolamine, monoisopropanolamine, diisopropanolamine, and triisopropanolamine, etc. Examples of the alkali metal hydroxide include lithium hydroxide, sodium hydroxide and potassium hydroxide. Among them, sodium hydroxide, potassium hydroxide, triethylamine, and triethanolamine are preferred from the viewpoint of the stabilization of dispersion of the self-dispersing polymer particles in exemplary embodiments of the invention into water.

These basic compounds are preferably used in an amount of from 5 mol % to 120 mol %, more preferably from 20 mol % to 100 mol %, and further preferably from 30 mol % to 80 mol %, based on 100 mol % of the dissociative group. When the content is 15 mol % or more, an effect of stabilizing the dispersion of particles in water is exhibited, and when the content is 80 mol % or less, an effect of reducing water-soluble components is obtained.

In the process (2), an aqueous dispersion of self-dispersing polymer particles can be obtained by distilling off the organic solvent from the dispersion obtained in the process (1) by a conventional method such as distillation under reduced pressure, to thereby bring about phase inversion into an aqueous system. The organic solvent in the obtained aqueous dispersion is substantially removed, and the amount of the organic solvent is preferably 0.2% by mass or less, and more preferably 0.1% by mass or less.

The average particle size of the self-dispersing polymer particles according to exemplary embodiments of the invention is preferably in the range of 1 nm to 100 nm, more preferably 3 nm to 80 nm, and further preferably 5 nm to 60 nm. The average particle size is particularly preferably from 5 nm to 40 nm. With an average particle size of 1 nm or more, manufacturability is enhanced. Further, with an average particle size of 100 nm or less, storage stability is enhanced. Here, the average particle size means a volume average particle size.

The particle size distribution of the self-dispersing polymer particles is not particularly limited, and the polymer particles may have a broad particle size distribution or a mono-dispersed particle size distribution. Water-insoluble particles may also be used as mixtures of two or more types.

The average particle size and particle size distribution of the self-dispersing polymer particles can be measured using, for example, a light scattering method.

In the ink composition in exemplary embodiments of the invention, the self-dispersing polymer particles preferably exist in a form that does not substantially contain a colorant.

The self-dispersing polymer particles in exemplary embodiments of the invention have excellent self-dispersibility, and the stability of a dispersion of the polymer alone is very high. However, for example, since the function as a so-called dispersant for stably dispersing a pigment is not very significant, if the self-dispersing polymer according to exemplary embodiments of the invention is present in the ink composition in a form containing a pigment, consequently the stability of the ink composition as a whole may be greatly decreased.

The ink composition for ink-jet recording of the present invention may contain one type of self-dispersing polymer particles alone, or may contain two or more types of such particles.

The content of the self-dispersing polymer particles in the ink composition in exemplary embodiments of the invention is preferably from 1% by mass to 30% by mass, more preferably from 2% by mass to 20% by mass, and particularly preferably from 2% by mass to 10% by mass, based on the ink composition for ink-jet recording, from the viewpoint of the glossiness of images.

The content ratio of the coloring particles and the self-dispersing polymer particles (coloring particles/self-dispersing polymer particles) in the ink composition for ink-jet recording of exemplary embodiments of the invention is preferably from 1/0.5 to 1/10, and more preferably from 1/1 to 1/4, from the viewpoint of rub resistance of images.

(Other Additives)

The ink composition for ink-jet recording in exemplary embodiments of the invention can further include other additives if necessary, in addition to the components mentioned above.

Examples of the other additives according to exemplary embodiments of the invention include known additives such as color fading inhibitor, emulsion stabilizer, permeation accelerator, ultraviolet absorber, preservative, mildew-proofing agent, pH adjusting agent, surface tension regulator, defoamer, viscosity adjusting agent, dispersant, dispersed stabilizer, anti-rust agent and chelating agent. These various additives may be added directly after the preparation of the ink composition for ink-jet recording, or may be added during the preparation of the ink composition for ink-jet recording. Specifically, the other additives and the like described in paragraphs [0153] to [0162] of JP-A No. 2007-100071 are included.

The surface tension adjusting agent may be a nonionic surfactant, a cationic surfactant, an anionic surfactant, a betaine surfactant or the like.

The amount of addition of the surface tension adjusting agent is preferably an amount of addition that adjusts the surface tension of the ink composition to 20 mN/m to 60 mN/m, more preferably an amount of addition that adjusts the surface tension to 20 mN/m to 45 mN/m, and further preferably an amount of addition that adjusts the surface tension to 25 mN/m to 40 mN/m, in order to spot the ink composition satisfactorily by the ink-jet method. The surface tension of the ink composition can be measured, for example, using a plate method at 25° C.

Specific examples of the surfactant as a hydrocarbon type preferably include anionic surfactants such as fatty acid salts, alkyl sulfuric acid ester salts, alkyl benzenesulfonates, alkyl naphthalenesulfonates, dialkyl sulfosuccinates, alkyl phosphoric acid ester salts, naphthalenesulfonic acid-formalin condensates and polyoxyethylene alkyl sulfuric acid salts; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester and oxyethylene oxypropylene block copolymer. SURFYNOLS (trade name, products of Air Products & Chemicals) and OLFINE E1010 (trade name, surfactant, manufactured by Nisshin Chemical Industry Co., Ltd.) which are an acetylene type polyoxyethylene oxide surfactant) are preferably used. Furthermore, amine oxide type amphoteric surfactants such as N,N-dimethyl-N-alkyl amine oxide are preferred.

Additionally, materials described on pages (37) to (38) of JP-A No. 59-157636 and Research Disclosure No. 308119 (1989) as surfactants can be used.

When fluorocarbon (alkyl fluoride type) surfactants, silicone surfactants or the like, such as those described in JP-A Nos. 2003-322926, 2004-325707 and 2004-309806 are used, rub resistance can be improved.

The surface tension regulator can be used as an antifoamer, and fluorine compounds, silicone compounds, chelating agents represented by EDTA, and the like can be used.

When the application of ink is carried out by the ink-jet method, the viscosity of the ink composition in exemplary embodiments of the invention is preferably in the range of 1 mPa·s to 30 mPa·s, more preferably in the range of 1 mPa·s to 20 mPa·s, further preferably in the range of 2 mPa·s to 15 mPa·s, and particularly preferably in the range of 2 mPa·s to 10 mPa·s, from the viewpoints of the droplet ejection stability and rate of aggregation.

The viscosity of the ink composition can be measured by, for example, Brookfield Viscometer at 20° C.

In exemplary embodiments of the invention, the pH of the ink composition is preferably 7.5 to 10, and more preferably 8 to 9, from the viewpoint of the ink stability and rate of aggregation. The pH of the ink composition may be measured using a conventional pH measurement apparatus (for example, a multi water quality meter MM-60R; trade name, manufactured by DKK-TOA CORPORATION) at a temperature of 25° C. The pH of the ink composition is appropriately controlled by applying an acidic compound or basic compound. A conventional acidic compound or basic compound may be used as the acidic compound or basic compound without any restriction.

<Ink Set>

The ink set in exemplary embodiments of the invention includes at least one of the ink compositions for ink-jet recording, and at least one treatment liquid configured to form aggregates when contacted with the ink composition for ink-jet recording.

The ink set in exemplary embodiments of the invention is used in an image forming method of using the ink composition for ink-jet recording, and is particularly preferable as an ink set used in the image forming method as will be described later.

The ink set in exemplary embodiments of the invention can be used in the form of an ink cartridge holding these inks collectively or independently, and is preferable in view of the ease of handling. The ink cartridge constituted to include the ink set is known in the related technical field, and can be prepared as an ink cartridge by appropriately using a known method.

—Treatment Liquid—

The treatment liquid in exemplary embodiments of the invention is an aqueous composition which forms an aggregate when contacted with the ink composition for ink-jet recording, and specifically, contains at least an aggregating component which may aggregate the dispersed particles such as the particles of resin-coated pigments in the ink composition to form an aggregate and, if necessary, may contain other components. By using the treatment liquid together with the ink composition, ink-jet recording may be speeded up and, even when high speed recording is performed, an image having high density and high resolution is obtained.

(Aggregating Components)

The treatment liquid contains at least one aggregating component which forms an aggregate when contacted with the ink composition. By mixing the treatment liquid into the ink composition ejected by an ink-jet method, aggregation of a pigment or the like which has been stably dispersed in the ink composition is promoted.

Examples of the treatment liquid include a liquid composition which may generate an aggregate by changing the pH of the ink composition. Thereupon, the pH (25° C.) of the treatment liquid is preferably from 1 to 6, more preferably from 1.2 to 5, and further preferably from 1.5 to 4 from the viewpoints of the aggregation rate of the ink composition. In this case, the pH (25° C.) of the ink composition used in the ejection step is preferably 7.5 to 9.5 (more preferably 8.0 to 9.0).

In exemplary embodiments of the invention, it is preferable that the pH (25° C.) of the ink composition is 7.5 or higher, and the pH (25° C.) of the treatment liquid is 3 to 5, from the viewpoint of the image density, the resolution, and speeding-up of ink-jet recording.

The aggregating component may be used alone, or two or more of them may be used by mixing them.

The treatment liquid may be prepared by using at least one acidic compound as the aggregating component. As the acidic compound, compounds having a phosphoric acid group, a phosphonic acid group, a phosphinic acid group, a sulfuric acid group, a sulfonic acid group, a sulfinic acid group, or a carboxy group, or salts thereof (e.g. polyvalent metal salts) may be used. Among them, from the viewpoint of the aggregation rate of the ink composition, compounds having a phosphoric acid group or a carboxy group are more preferable, and compounds having a carboxy group are further preferable.

The compound having a carboxy group is preferably selected from polyacrylic acid, acetic acid, glycoric acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrole carboxylic acid, furan carboxylic acid, pyridine carboxylic acid, coumalic acid, thiophene carboxylic acid, nicotinic acid, or derivatives of such compound or salts thereof (for example, polyvalent metal salts, etc.) One of these compounds may be used alone or two or more of these compounds may be used together.

The treatment liquid in exemplary embodiments of the invention may further include an aqueous solvent (for example, water) in addition to the acidic compound described above.

The content of the acidic compound in the treatment liquid is, preferably, from 5% by mass to 95% by mass and, more preferably, from 10% by mass to 80% by mass based on the entire mass of the treatment liquid from the viewpoint of aggregation effect.

Preferred examples of the treatment liquid that may improve the high speed aggregation property include a treatment liquid including a polyvalent metal salt or a polyallyl amine. Examples of the polyvalent metal salt and a polyallyl amine include salts of alkaline earth metals belonging to group 2 of the periodic table (for example, magnesium and calcium), salts of a transition metal belonging to group 3 of the periodic table (for example, lanthanum), salts of a cation of a metal belonging to group 13 of the periodic table (for example, aluminum), salts of a lanthanide (for example, neodium), polyallylamine and polyallylamine derivatives. As the metal salts, carboxylic acid salts (such as, salts of formic acid, salts of acetic acid, and salts of benzoic acid), nitric acid salts, chlorides, and thiocyanic acid salts are preferred, and calcium salts or magnesium salt of a carboxylic acid (such as salts of formic acid, salts of acetic acid, and salts of benzoic acid), calcium salt of nitric acid or magnesium salt of nitric acid, calcium chloride, magnesium chloride, and calcium salt of thiocyanic acid or magnesium salt of thiocyanic acid are more preferred.

The content of the metal salt in the treatment liquid is preferably from 1% by mass to 10% by mass, more preferably, from 1.5% by mass to 7% by mass and, further preferably, from 2% by mass to 6% by mass.

The viscosity of the treatment liquid is, preferably, in a range from 1 mPa·s to 30 mPa·s, more preferably, in a range from 1 mPa·s to 20 mPa·s, further preferably, in a range from 2 mPa·s to 15 mPa·s, and, particularly preferably, in a range from 2 mPa·s to 10 mPa·s from the viewpoint of the aggregation rate of the ink composition. The viscosity is measured by using VISCOMETER TV-22 (trade name, manufactured by TOKI SANGYO CO., LTD.) under the condition at 20° C.

The surface tension of the treatment liquid is, preferably, from 20 mN/m to 60 mN/m, more preferably, from 20 mN/m to 45 mN/m and, further preferably, from 25 mN/m to 40 mN/m from the viewpoint of the aggregation rate of the ink composition. The surface tension is measured by using Automatic Surface Tensiometer CBVP-Z (trade name, manufactured by Kyowa Interface Science Co. Ltd.) under the condition of being at 25° C.

<Inkjet Image Forming Method>

The inkjet image forming method of one aspect of the invention include discharging, onto a recording medium, the ink composition for inkjet recording through an inkjet head, which is provided with a silicone nozzle plate, to form an image. The inkjet image forming method may further include one or more other process(es).

In embodiments, the inkjet image forming method may preferably further include applying, onto the recording medium, a treatment liquid which is capable of forming an aggregate when contacted with the ink composition.

[Ejection of Ink Composition]

In the process of discharging of the ink composition, the ink composition is applied from an inkjet head provided with a silicone nozzle plate onto a recording medium by inkjet method. This process may enable to selectively apply the ink composition to the recording medium to form a desired image. Details and preferable embodiments of components of the ink composition are described above.

Image recording utilizing the ink-jet method can be performed, specifically, by supplying energy thereby ejecting a liquid composition to a desired recording medium, that is, plain paper, resin-coated paper, paper used exclusively for ink-jet recording described, for example, in JP-A Nos. 8-169172, 8-27693, 2-276670, 7-276789, 9-323475, 62-238783, 10-153989, 10-217473, 10-235995, 10-337947, and 10-217597, films, common use paper for electrophotography, clothes, glass, metals, ceramics, etc. As the ink-jet recording method suitable to exemplary embodiments of the invention, a method described in JP-A No. 2003-306623, in columns (0093) to (0105) may be applicable.

The ink-jet method is not particularly limited and may be of any known system, for example, a charge control system of ejecting an ink utilizing an electrostatic attraction force, a drop on demand system of utilizing a vibration pressure of a piezo element (pressure pulse system), an acoustic ink-jet system of converting electric signals into acoustic beams, irradiating them to an ink, and ejecting the ink utilizing a radiation pressure, and a thermal ink-jet system of heating an ink to form bubbles and utilizing the resultant pressure (BUBBLEJET (registered trade mark)). Examples of the ink-jet method include a system of injecting a number of ink droplets of low concentration, a so-called "photo-ink" each in a small volume, a system of improving an image quality using plural inks of a substantially identical hue and of different concentrations, and a system of using a colorless transparent ink.

The ink-jet head used in the ink-jet method may be either an on-demand system or a continuous system. The ejection system includes, specifically, for example, an electric-mechanical conversion system (for example, single cavity type, double cavity type, bender type, piston type, share mode type, and shared wall type, etc.), an electric-thermal conversion system (for example, thermal ink-jet type, BUBBLEJET (registered trade mark) type, etc.), an electrostatic attraction system (for example, electric field control type, and slit jet type, etc.), and an electric ejecting system (for example, spark jet type, etc.) and any of the ejection systems may be used.

Ink nozzles, etc. used for recording by the ink-jet method are not particularly limited but can be selected properly depending on the purpose.

Examples of the ink-jet method include an ink-jet head of a shuttle system in which a short serial head is used and recording is performed while allowing the head to scan in the lateral direction of a recording medium, and an ink-jet head of a line system in which a line head in which recording elements are arranged corresponding to the entire region for one side of a recording medium is used. In the line system, an image can be recorded over the entire surface of the recording medium by allowing the recording medium to be scanned in the direction being at right angles to the direction of arranging the recording elements, in which a transportation system such as a carriage by which the short head moves for scanning is not necessary. Further, since complicated scanning control for the movement of the carriage and the recording medium is not necessary and only the recording medium is moved, higher recording speed can be attained as compared with the shuttle system. While the ink-jet recording method in exemplary embodiments of the invention is applicable to any one of them, the effect of improving the ejection accuracy and the rub resistance of the image is generally remarkable when the ink-jet recording method is applied to the line system without performing dummy jetting.

Furthermore, in the ink discharging step according to exemplary embodiments of the invention, when a line method is employed, recording can be suitably performed not only using one type of the ink composition, but also using two or more types of ink compositions, by setting the ejection (droplet ejection) interval between the first ejected ink composition (n-th color (n≥1), for example, the second color) and the subsequently ejected ink composition ((n+1)-th color, for example, the third color), at 1 second or less. According to exemplary embodiments of the invention, by setting the ejection interval at 1 second or less in the line method, images having excellent rub resistance and suppressed occurrence of blocking can be obtained under high speed recording that is faster than that conventionally obtained, while preventing the spreading caused by the interference between ink droplets or mixed colors. Further, images having excellent hue and drawing properties (reproducibility of fine lines or fine parts in the image) can be obtained.

The amount of ink droplet of the ink ejected from the inkjet head is preferably 0.5 pL (picoliter) to 6 pL, more preferably 1 pL to 5 pL and further preferably 2 pL to 4 pL, from the viewpoint of obtaining high accuracy images.

(Inkjet Head Having Silicone Nozzle Plate)

The inkjet head employed in the image forming method has a nozzle plate. At least a part of the nozzle plate contains silicone. FIG. 1 is a schematic diagram showing one example of an internal structure of the inkjet head.

FIG. 1 shows an inkjet head 100 having a nozzle plate 11 and an ink supplying unit 20 which is provided on a opposite side from the ink ejecting direction of the nozzle plate. The nozzle plate 11 has plural ejection openings 12 through which inks are ejected.

Figure 2:
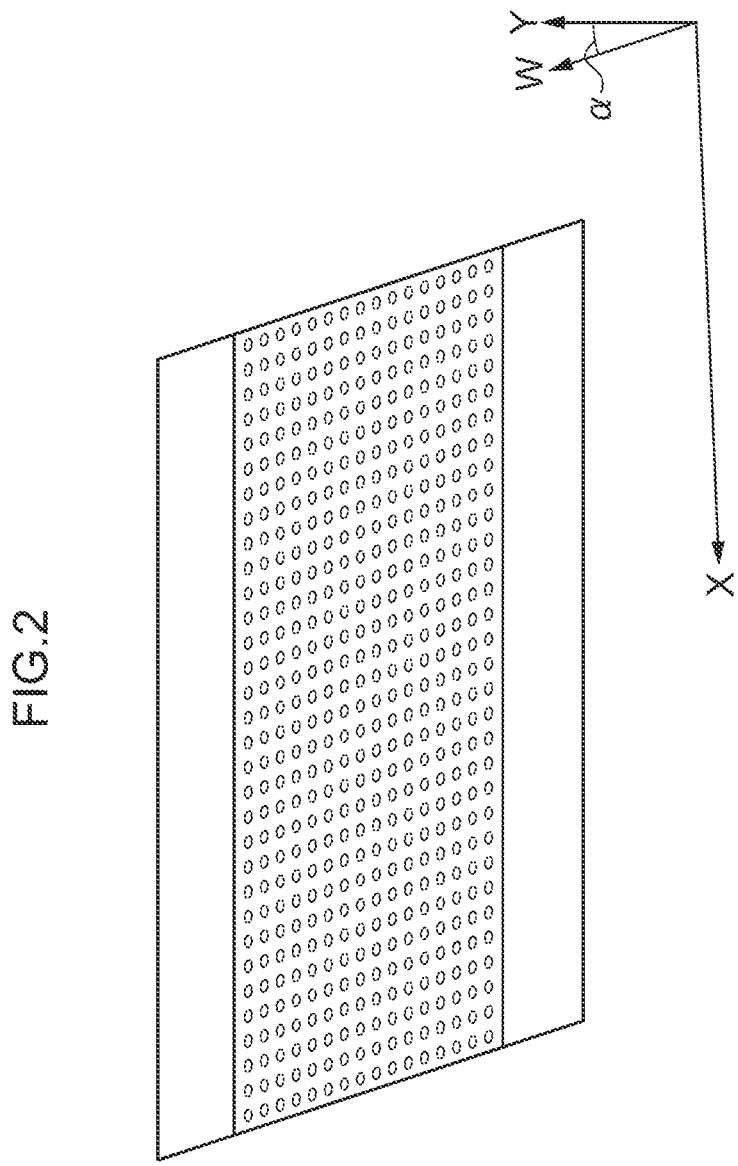
FIG. 2 is a schematic diagram showing one example of an alignment of ejection openings on a nozzle plate.

FIG. 2 shows a two-dimensional alignment of 32×60 ejection openings (nozzles) provided with the nozzle plate 11. At least a part of the nozzle plate is formed from silicone. The silicone is exposed at an inner wall of an opening of each nozzle and a surface of the nozzle plate 11 which resides at a side to which direction the ink composition is ejected. A liquid-repellant film, which is not shown in the Figures, is provided at least a part of the surface of the nozzle plate 11 which resides at an ink ejecting direction side.

The ink supply unit 20 is equipped with plural pressure chambers 21, each of which communicates with each of the plural ejection openings 12 of the nozzle plate 11 through the nozzle communication path 22, plural ink supplying paths 23 that supply ink to each of the plural pressure chambers 21, a common liquid chamber 25 that supplies ink to the plural ink supplying paths 23, and a pressure generation unit 30 that transforms each of the plural pressure chambers 21.

The ink supplying paths 23 locate between the nozzle plate 11 and the pressure generating unit 30 and an ink which has been supplied to the common liquid chamber 25 is introduced to the ink supplying path 23. One terminal of a supply regulating path 24 which is connected with the pressure chambers 21 is connected to the ink supplying path 23 so that an amount of an ink supplied from the ink supplying path 23 to the pressure chamber 21 may be regulated to be a desired one. This system may enable to supply a plenty of amount of ink to the plural ejection openings.

The pressure generating unit 30 has a configuration in which a vibration plate 31, an adhesion layer 32, a lower electrode 33, a piezoelectric layer 34, and an upper electrode 35 are provided in this order from the side at which the pressure chamber 21 resides. An electric wiring which supplies driving signal from outside is connected to the pressure generating unit 30. Transformation of the piezoelectric device which is caused in accordance with the driving signal leads ejection of an ink from the ejection opening 12 of the nozzle through the nozzle communication path 22.

A circulation aperture 41 which continuously collects an ink to a circulation path 42 is provided in the vicinity of the ejection opening 12. Increase of viscosity of an ink in the vicinity of the ejection opening during non-driving period may be suppressed thereby.

—Treatment Liquid Applying Step—

The treatment liquid applying step performs imaging by applying a treatment liquid configured to form aggregates when contacted with the ink composition, to a recording medium, and placing the treatment liquid in contact with an ink composition. In this case, dispersed particles of the polymer particles or resin coated pigments in the ink composition aggregate, and an image is fixed to the recording medium. In addition, the details and preferred embodiments of the respective components in the treatment liquid are as described previously.

Application of the treatment liquid may be performed by applying known methods such as a coating method, an ink-jet method, and an immersion method. The coating method may be performed by a known coating method using a bar coater, an extrusion die coater, an air doctor coater, a bread coater, a rod coater, a knife coater, a squeeze coater, a reverse roll coater, or a bar coater. Details of the ink-jet method are as described above.

The treatment liquid discharging step may be provided before or after the ink applying step using the ink composition.

In the invention, an embodiment in which the ink discharging step is provided after the treatment liquid is applied in a treatment liquid applying step, is preferable. That is, an embodiment in which, before application of the ink composition onto the recording medium, a treatment liquid for aggregating a resin coated pigment in the ink composition is applied in advance, and the ink composition is applied so as to contact the treatment liquid applied on the recording medium to form an image, is preferable. Thereby, ink-jet recording may be speeded-up and, even when high speed recording is performed, an image having high density, and high resolution is obtained.

The amount of application of the treatment liquid is not particularly limited so long as the liquid can aggregate the ink composition, but can be an amount resulting in an amount of application of the aggregated component (for example, a carboxylic acid or a cationic organic compound having a valency of 2 or greater) of 0.1 g/m$^2$ or more. Among them, an amount resulting in an amount of application of the aggregated component of 0.1 to 1.0 g/m$^2$ is preferred, and an amount resulting in 0.2 to 0.8 g/m$^2$ is more preferred. When the amount of application of the aggregated component is 0.1 g/m$^2$ or more, the aggregation reaction proceeds satisfactorily, and when the amount is 1.0 g/m$^2$ or less, the glossiness is not very high, and is preferable.

According to exemplary embodiments of the invention, it is preferable to provide an ink discharging step after the treatment liquid applying step, and to further provide a heating drying step of heating and drying the treatment liquid on the recording medium, between the time after applying the treatment liquid onto the recording medium, and the time until the ink composition is applied. By heating and drying the treatment liquid previously before the ink discharging step, ink coloring properties such as the prevention of spreading becomes good, and visible images having good color density and hue can be recorded.

The heating and drying can be carried out by a known heating means such as heater, an air blowing means utilizing air blowing such as dryer, or a means combining these. Examples of the heating method include a method of supplying heat by a heater or the like, from the surface of the recording medium opposite the surface applied with the treatment liquid, a method of blowing a warm air or hot air to the surface of the recording medium applied with the treatment liquid, a method of heating using an infrared heater, or the like. Heating can also be performed by combining these methods.

[Heating Fixing Step]

It is preferable that the ink-jet recording method in exemplary embodiments of the invention includes, after the ink applying step, a heating fixing step for heating and fixing the ink image formed by the application of the ink composition by placing the image in contact with a heated surface. By adding a heating fixing treatment, fixing of the image on the recording medium is achieved, and the resistance of the images to scratches can be further enhanced.

The heating method is not particularly limited, but methods of non-contact drying such as a method of heating with a heat generator such as a nichrome wire heater; a method of supplying warm air or hot air; and a method of heating with a halogen lamp, an infrared lamp or the like, may be suitably exemplified. The method of heating and pressing is not particularly limited, but methods of performing heating and fixing by contact such as, for example, a method of pressing a heat plate to the image-formed surface of the recording medium, and a method of passing the image through a pair of rollers using a heating and pressing apparatus equipped with a pair of heating and pressing rollers, a pair of heating and pressing belts, or a heating and pressing belt disposed on the side of the image-recorded surface of the recording medium and a retaining roller disposed on the opposite side, may be suitably mentioned.

The speed of conveyance of the recording medium when a heating and pressing roller or a heating and pressing belt is used is preferably in the range of 200 mm/second to 700 mm/second, more preferably 300 mm/second to 650 mm/second, and further preferably 400 mm/second to 600 mm/second.

—Recording Medium—

The ink-jet recording method in exemplary embodiments of the invention is to record an image on the recording medium.

The recording medium is not particularly limited, and general printing paper containing cellulose as a main component such as so-called high-quality paper, coated paper, and art paper may be used. The general printing paper containing cellulose as a main component absorbs and dries an ink relatively slowly, easily causes coloring material movement after a droplet is spotted, and allows image quality to easily deteriorate in image recording by a general ink-jet method using an aqueous ink. However, according to the ink-jet recording method in exemplary embodiments of the invention, coloring material movement is suppressed, and a high-quality image excellent in color density and hue may be recorded.

As the recording medium, a recording medium which is generally commercially available may be used, and examples include high quality paper such as OK Prince High Quality (trade name, manufactured by Oji Paper Co., Ltd.), Shiorai (trade name, manufactured by Nippon Paper Industries Co., Ltd.), and New NP High Quality (trade name, manufactured by Nippon Paper Industries Co., Ltd.), fine coated paper such as OK Ever Lite Coat (trade name, manufactured by Oji Paper Co., Ltd.) and Aurora S (trade name, Nippon Paper Industries Co., Ltd.), light coated paper (A3) such as OK Coat L (trade name, manufactured by Oji Paper Co., Ltd.) and Aurora L (trade name, manufactured by Nippon Paper Industries Co., Ltd.), coated paper (A2, B2) such as OK Top Coat+(trade name, manufactured by Oji Paper Co., Ltd.) and Aurora Coat (trade name, manufactured by Nippon Paper Industries Co., Ltd.), and an art paper (A1) such as OK Kanefuji+(trade name, manufactured by Oji Paper Co., Ltd.) and Tokubishi Art (trade name, manufactured by Nippon Paper Industries Co., Ltd.). Further, various papers for photography for use in ink-jet recording may be used.

Among them, from the viewpoint of that the effect of suppressing coloring material movement is great, and a high quality image having better color density and hue than the previous ones is obtained, a recording medium having a water absorption coefficient Ka of 0.05 mL/m$^2$·ms$^{1/2}$ to 0.5 mL/m$^2$·ms$^{1/2}$ is preferable, a recording medium having the water absorption coefficient Ka of 0.1 mL/m$^2$·ms$^{1/2}$ to 0.4 mL/m$^2$·ms$^{1/2}$ is more preferable, and a recording medium having the water absorption coefficient Ka of 0.2 mL/m$^2$·ms$^{1/2}$ to 0.3 mL/m$^2$·ms$^{1/2}$ is further preferable.

The water absorption coefficient Ka has the same meaning as described in JAPAN TAPPI, Pulp test method No. 51: 2000 (published by JAPAN TAPPI), and specifically, the absorption coefficient Ka is calculated from the difference in the amount of transfer of water at a contact time of 100 ms and a contact time of 900 ms, using an automatic scanning absorptometer KM500Win (manufactured by Kumagai Riki Kogyo Co., Ltd.).

Among the recording media, a so-called coated paper used in general offset printing is preferred. The coated paper is a product obtained by coating with a coating material the surface of a paper such as a high quality paper or neutral paper which is mainly based on cellulose and is not surface treated. The coated paper is likely to cause problems in product quality such as the gloss or rub resistance of images, in the conventional image formation by aqueous ink-jet recording, but in the ink-jet recording method in exemplary embodiments of the invention, gloss irregularity is suppressed, and images having good glossiness and rub resistance are obtained. Particularly, it is preferable to use a coated paper having a base paper and a coating layer containing kaolin and/or calcium bicarbonate. More specifically, art paper, coated paper, lightweight coated paper or finely coated paper is more preferred.

EXAMPLES

Hereinafter, the present invention will be specifically described with reference to Examples, but the present invention is not limited to these Examples. Unless stated otherwise, the "parts" and "%" are based on mass.

HLC-8220 GPC (trade name, manufactured by Tosoh Corp.) was used for the GPC, and TSKGEL SUPER HZM-H, TSKGEL SUPER HZ4000, and TSKGEL SUPER HZ2000 (trade names, all manufactured by Tosoh Corp.) were used as the columns and were connected in a series of three. The eluent liquid was THF (tetrahydrofuran). For the conditions, the sample concentration was 0.35% by mass, the flow rate was 0.35 mL/min, the amount of sample injection was 10 μL, the measurement temperature was 40° C., and an RI detector was used. A calibration curve was produced from 8 samples of the 2 standard sample TSK standard, "polystyrene": "F-40", "F-20", "F-4", "F-1", "A-5000", "A-2500", "A-1000" and "n-propylbenzene" (trade names) manufactured by Tosoh Corp.

Synthesis Example 1

Synthesis of Mixture of Monomers M-25 and M-27 (Monomer Mixture (M-25/M-27))

9.76 parts of 9(10H)-acridone and 5.61 parts of potassium t-butoxide were dissolved in 30 parts of dimethyl sulfoxide and heated to 45° C. 15.26 parts of chloromethylstyrene (trade name: CMS-P, manufactured by SEIMI CHEMICAL Co., Ltd., a mixture of para-form/meta-form=50/50 (mol/mol)) was added dropwise to the resulting liquid, which was further heated and stirred at 50° C. for 5 hours. The resulting reaction liquid was poured to 200 parts of distilled water with stirring. The resulting precipitate was filtered off and washed. 11.9 parts of a monomer mixture (M-25/M-27) was thus obtained.

Synthesis Example 2

Synthesis of Water-Insoluble Resin P-1

88 g of methyl ethyl ketone was added to a 1000-mL three-necked flask equipped with an agitator and a cooling tube, and was heated to 72° C. under a nitrogen atmosphere. To this, a solution of 0.85 g of dimethyl 2,2'-azobisisobutyrate, 15 g of a monomer mixture of (M-25/M-27), 10 g of methacrylic acid and 75 g of ethyl methacrylate dissolved in 50 g of methyl ethyl ketone was added dropwise over 3 hours. After the addition was completed, the mixture was reacted for one more hour, and then a solution of 0.42 g of dimethyl-2,2'-azobisisobutyrate dissolved in 2 g of methyl ethyl ketone was added. The temperature was raised to 78° C., and the mixture was heated for 4 hours. The obtained reaction solution was precipitated two times in excess of hexane, and the precipitated resin was dried to obtain 96.5 g of a water-insoluble resin P-1 (monomer mixture (M-25/M27)/ethyl methacrylate/methacrylic acid copolymer (copolymerization ratio=15/75/10 by mass percent), which is, in some cases, referred as a resin dispersant P-1).

The composition of the obtained water-insoluble resin P-1 was confirmed by $^1$H-NMR, and the weight average molecular weight (Mw) determined by GPC was 49,400. The acid value of the resin dispersant P-1 was determined by the method described in JIS Standards (JIS K 0070: 1992), and the value was 65.2 mgKOH/g. An amount of the water-insoluble resin P-1 dissolved in 100 g of water at temperature of 25° C. was less than 5 g.

Synthesis Example 3

Synthesis of Water-Insoluble Resin P-2

88 g of methyl ethyl ketone was placed in a 1000-mL three-necked flask equipped with a stirrer and a cooling tube, and heated to 72° C. in a nitrogen atmosphere. Into the flask, A solution prepared by dissolving 0.85 g of dimethyl 2,2'-azobisisobutyrate, 50 g of phenoxyethyl methacrylate, 13 g of methacrylic acid, and 37 g of methyl methacrylate in 50 g of methyl ethyl ketone was added dropwise to the flask over a period of 3 hours. After completion of the addition, the reaction was continued for further one hour, and then a solution prepared by dissolving 0.42 g of dimethyl 2,2'-azobisisobutyrate in 2 g of methyl ethyl ketone was added into the flask, and the solution was heated at 78° C. for 4 hours. The reaction solution thus obtained was reprecipitated twice in an excess amount of hexane, and the precipitated resin was dried to obtain 96.5 g of a phenoxyethyl methacrylate/methyl methacrylate/methacrylic acid (copolymerization ratio [% by mass]=50/37/13) copolymer (water-insoluble resin P-2).

The composition of the water-insoluble resin P-2 thus obtained was confirmed by $^1$H-NMR. The weight average molecular weight (Mw) thereof determined by GPC was 49400. The acid value thereof determined by the method described in Japanese Industrial Standard (JIS K 0070:1992), the disclosure of which is entirely incorporated by reference herein, was 84.8 mgKOH/g.

The dissolved amount of the water-insoluble resin P-2, which is an amount of the water-insoluble resin P-2 dissolved to 100 g of water at 25° C., was no more than 5 g.

Synthesis Example 4

Synthesis of Water-Insoluble Resin P-3

A water-insoluble resin P-3 was obtained in a substantially similar manner to that in the synthesis of the water-insoluble resin P-1, except that the monomer mixture (M-25/M-27), ethyl methacrylate, and methacrylic acid that were used in the synthesis of the water-insoluble resin P-1 were replaced by benzyl methacrylate and methacrylic acid (copolymerization ratio (% by mass)=92/8) as shown in the following Table 1.

The composition of the water-insoluble resin P-3 thus obtained was confirmed by $^1$H-NMR. The weight average molecular weight (Mw) thereof determined by GPC was 41200.

The acid value thereof determined by the method described in Japanese Industrial Standard (JIS K 0070:1992; described above) was 52.2 mgKOH/g.

The dissolved amount of the water-insoluble resin P-3, which is an amount of the water-insoluble resin P-3 dissolved to 100 g of water at 25° C., was no more than 5 g.

Synthesis Example 5

Synthesis of Water-Soluble Resin P-4

A water-soluble resin P-4 was obtained in a substantially similar manner to that in the synthesis of the water-insoluble resin P-2, except that the copolymerization ratio of the phenoxyethyl methacrylate, methyl methacrylate, and methacrylic acid that was used in the synthesis of the water-insoluble resin P-2 was changed to 50/11/39 in terms of % by mass.

The composition of the water-soluble resin P-4 thus obtained was confirmed by $^1$H-NMR. The weight average molecular weight (Mw) thereof determined by GPC was 48900. The acid value thereof determined by the method described in Japanese Industrial Standard (JIS K 0070:1992; described above) was 254.2 mgKOH/g.

The dissolved amount of the water-soluble resin P-4, which is an amount of the water-soluble resin P-4 dissolved to 100 g of water at 25° C., was more than 5 g. Namely, the water-soluble resin P-4 was water-soluble.

Synthetic Example 6

Production of Self-Dispersing Polymer Particles 540.0 g of methyl ethyl ketone was introduced into a two litter three-necked flask equipped with an agitator, a thermometer, a reflux cooling tube and a nitrogen gas inlet tube, and the temperature was increased to 75° C. under a nitrogen atmosphere. While maintaining the temperature in the reaction vessel at 75° C., a mixed solution formed from 216 g of methyl methacrylate (MMA), 280.8 g of isobornyl methacrylate (IBOMA), 43.2 g of methacrylic acid (MAA), 108 g of methyl ethyl ketone and 2.16 g of "V-601" (trade name, manufactured by Wako Pure Chemical Industries, Ltd.) was added dropwise at a constant rate so that dropping would be completed in 2 hours. After the addition was completed, a solution formed from 1.08 g of "V-601" and 15.0 g of methyl ethyl ketone was added, and the mixture was stirred for 2 hours at 75° C. A solution formed from 0.54 g of "V-601" and 15.0 g of methyl ethyl ketone was further added, and the mixture was stirred for 2 hours at 75° C. The temperature was increased to 85° C., and stirring was continued for 2 hours.

The weight average molecular weight (Mw) of the obtained copolymer was 63,000, and the acid value was 52.1 mg KOH/g.

Next, 588.2 g of the polymerized solution was weighed, and 165 g of isopropanol and 120.8 mL of a 1 mol/L aqueous NaOH solution were added. The temperature in the reaction vessel was increased to 80° C. Subsequently, 718 g of distilled water was added dropwise at a rate of 20 mL/min to achieve dispersion in water. Subsequently, the solvent was distilled off under the atmospheric pressure, while holding for 2 hours at a temperature of 80° C., for 2 hours at 85° C., and for 2 hours at 90° C. in the reactive vessel. The pressure inside the reaction vessel was further reduced to distill off isopropanol, methyl ethyl ketone and distilled water, and a dispersion of a self-dispersing polymer (B-02) at a solids concentration of 26.0% was obtained.

The glass transition temperature of the obtained polymer (B-02) was measured by the following method, and was 160° C.

The polymer solution after polymerization in an amount of 0.5 g in terms of solid fraction was dried under reduced pressure at 50° C. for 4 hours to obtain a polymer solid fraction. The obtained polymer solid fraction was used to measure Tg by a differential scanning calorimeter (DSC) EXSTAR6220 (trade name) manufactured by SU Nanotechnology, Inc. The measurement conditions were such that 5 mg of a sample was sealed in an aluminum pan, and the value of the peak top of DDSC from the measurement data obtained at the time of second temperature increase in the following temperature profile under a nitrogen atmosphere, was designated as Tg.

from 30° C. to −50° C. (cooled at 50° C./min)
from −50° C. to 230° C. (heated at 20° C./min)
from 230° C. to −50° C. (cooled at 50° C./min)
from −50° C. to 230° C. (heated at 20° C./min)

(Preparation of Dispersion of Resin-Coated Pigment Particles R-1)

10 parts of pigment red 122 (trade name: CROMOPHTHAL JET MAGENTA DMQ, manufactured by Chiba Specialty Chemicals Corp.), 4.5 parts of the water-insoluble resin P-1 (the copolymer of the monomer mixture (M-25/M-27)/methyl methacrylate/methacrylic acid), 42 parts of methyl ethyl ketone, 4.2 parts of a 1M NaOH aqueous solution, and 87.2 parts of ion-exchanged water were mixed. The resulting mixture was subjected to mixing using a disper mill and further subjected to a treatment with a disperser (trade name: MICROFLUIDIZER M-140K, manufactured by Mizuho Industrial Co,. Ltd., 150 MPa) for 10 passes. Methyl ethyl ketone was removed from the resulting dispersion under vacuum at 55° C., and a part of water was further removed to provide a dispersion of resin-coated pigment particles R-1 having a pigment concentration of 10.2% by mass. Herein, the neutralization degree of the water-insoluble resin in the dispersion was 80%.

—Particle Diameter Measurement of Resin-Coated Pigment Particles—

The volume average particle diameter of resin-coated pigment particles R-1 in the obtained dispersion was measured using a NANOTRAC particle size distribution analyzer UPA-EX150 (trade name; manufactured by Nikkiso Co., Ltd.) by a dynamic light scattering method. This measurement was performed using a sample solution prepared by adding 10 mL of ion-exchanged water to 10 µL of the dispersion of resin-coated pigment particles and adjusting the temperature of the sample solution to 25° C. The volume average particle diameter measured thereby was 82 nm.

(Preparation of Dispersion of Resin-Coated Pigment Particles R-2)

A dispersion of resin-coated pigment particles R-2 having a pigment concentration of 10.2% by mass was obtained in a substantially similar manner to that in the preparation of the dispersion of resin-coated pigment particles R-1, except that the water-insoluble resin P-2 was used in place of the water-insoluble resin P-1, and the addition amount of the 1M NaOH was changed to 5.5 parts by mass. Herein, the neutralization degree of the water-insoluble resin in the dispersion was 80%, and the volume average particle diameter was 85 nm.

(Preparation of Dispersion of Resin-Coated Pigment Particles R-3)

A dispersion of resin-coated pigment particles R-3 having a pigment concentration of 10.2% by mass was obtained in a substantially similar manner to that in the preparation of the dispersion of resin-coated pigment particles R-1, except that the water-insoluble resin P-3 was used in place of the water-insoluble resin P-1, and the addition amount of the 1M NaOH was changed to 3.4 parts by mass. Herein, the neutralization degree of the water-insoluble resin in the dispersion was 80%, and the volume average particle diameter was 85 nm.

(Preparation of Dispersion of Resin-Coated Pigment Particles R-4)

A dispersion of resin-coated pigment particles R-4 having a pigment concentration of 10.2% by mass was obtained in a substantially similar manner to that in the preparation of the dispersion of resin-coated pigment particles R-1, except that the water-soluble resin P-4 was used in place of the water-insoluble resin P-1, and the addition amount of the 1M NaOH was changed to 16.5 parts by mass. Herein, the neutralization degree of the water-soluble resin in the dispersion was 80%, and the volume average particle diameter was 91 nm.

<Preparation of Ink Composition for Ink Jet Recording>

The dispersion of resin-coated pigment particles R-1 and the self-dispersing polymer particles B-02 obtained as described above were used, and various components were mixed to obtain the following ink composition. This was filled in a disposable syringe made of plastic, and filtered through a PVDF 5-µm filter (Millex-SV, trade name, diameter 25 mm, manufactured by Millipore Corp.), to produce a magenta ink (ink composition for ink-jet recording) M-1.

| Ink composition | |
|---|---|
| Resin-coated pigment particles R-1 | 40.7 parts |
| Self-dispersing polymer particles B-02 (solid content) | 7 parts |
| Colloidal silica (solid content) (trade name: SNOWTEX C, manufactured by Nissan Chemical Industries, Ltd., solid content 20%) | 1.5 parts |
| SANNIX GP250 (trade name, manufactured by Sanyo Chemical Industries, Ltd., hydrophilic organic solvent, I/O value 1.30) | 8 parts |
| Tripropylene glycol monomethyl ether (TPGmME) (manufactured by Wako Pure Chemical Industries, Ltd., hydrophilic organic solvent, I/O value 0.80) | 8 parts |
| OLFINE E1010 (trade name, manufactured by Nisshin Chemical Co., Ltd., surfactant) | 1 part |
| Ion-exchanged water | amount to make up 100 parts in total |

Cyan inks C-02 to C-07 were respectively produced in the same manner as described above, except that self-dispersing polymer particles B-02 to B-07 were respectively used instead of the self-dispersing polymer particles B-01 for the production of the cyan ink C-01.

Magenta inks of M-2 to M-11 were prepared in a manner substantially similar to that in the preparation of magenta ink M-1 except that the resin-coated pigment particles R-1 used in the preparation of magenta ink M-1 were respectively replaced with resin-coated pigment particles listed in the following Table 1, and the kind and content of the colloidal silica used in the preparation of magenta ink M-1 were respectively changed to the kind and content of the colloidal silica listed in the following Table 1 in the preparation of magenta inks of M-2 to M-11.

TABLE 1

| Ink composition | R.C.P.D | Water-insoluble resin Kind | Water-insoluble resin Acid value (mgKOH/g) | Colloidal silica Kind | Colloidal silica Volume average particle diameter (nm) | Colloidal silica Content (% by mass) | Content ratio by mass (colloidal silica/self-dispersing polymer particles) | Remarks |
|---|---|---|---|---|---|---|---|---|
| M-1 | R-1 | P-1 | 65.2 | SNOWTEX C | 15 | 1.5 | 0.80 | Present invention |
| M-2 | R-1 | P-1 | 65.2 | SNOWTEX C | 15 | 0.5 | 0.27 | Present invention |
| M-3 | R-1 | P-1 | 65.2 | SNOWTEX C | 15 | 0.05 | 0.027 | Present invention |
| M-4 | R-1 | P-1 | 65.2 | SNOWTEX C | 15 | 0.005 | 0.0027 | Present invention |
| M-5 | R-1 | P-1 | 65.2 | SNOWTEX XS | 5 | 0.05 | 0.027 | Present invention |

TABLE 1-continued

| Ink composition | R.C.P.D | Water-insoluble resin Kind | Acid value (mgKOH/g) | Colloidal silica Kind | Volume average particle diameter (nm) | Content (% by mass) | Content ratio by mass (colloidal silica/ self-dispersing polymer particles) | Remarks |
|---|---|---|---|---|---|---|---|---|
| M-6 | R-1 | P-1 | 65.2 | SNOWTEX CM | 25 | 0.05 | 0.027 | Present invention |
| M-7 | R-3 | P-3 | 52.2 | SNOWTEX C | 15 | 0.05 | 0.027 | Present invention |
| M-8 | R-2 | P-2 | 84.8 | SNOWTEX C | 15 | 0.05 | 0.027 | Present invention |
| M-9 | R-2 | P-2 | 84.8 | — | — | — | — | Comparative Example |
| M-10 | R-1 | P-1 | 65.2 | — | — | — | — | Comparative Example |
| M-11 | R-4 | P-4 | 254.2 | SNOWTEX C | 15 | 0.05 | 0.027 | Comparative Example |

In Table 1, an abbreviation of "R.C.P.D" denotes "Dispersion of Resin-coated pigment particles".

<Preparation of Treatment Liquid>

Treatment liquid (1) was prepared as described below.

—Preparation of Treatment Liquid (1)—

Various components were mixed to achieve the following composition, to produce a treatment liquid (1). The property values of the treatment liquid (1) were such as a viscosity of 2.6 mPa·s, a surface tension of 37.3 mN/m, and pH 1.6 (25° C.).

| Composition of treatment liquid (1) | |
|---|---|
| Malonic acid (divalent carboxylic acid, manufactured by Wako Pure Chemical Industries, Ltd.) | 15.0% |
| Diethylene glycol monomethyl ether (manufactured by Wako Pure Chemical Industries, Ltd.) | 20.0% |
| N-oleoyl-N-methyltaurine sodium (surfactant) | 1.0% |
| Ion-exchanged water | 64.0% |

<Image Formation and Evaluation>

An inkjet head having a silicone nozzle plate as shown in FIG. 1 was prepared. A reservoir tank connected to the inkjet head was refilled with the ink composition obtained as above. Herein, a liquid-repellent film was previously provided on the surface of the silicone nozzle plate by using a fluorinated alkylsilane compound. A recording medium (trade name: TOKUBISHI ART PAPER DOUBLE-SIDED N, manufactured by Mitsubishi Paper Mills Limited) was fixed on a stage that was movable in a predetermined linear direction at a speed of 500 mm/sec. The treatment liquid (1) was coated to form a coating film having a thickness of about 1.2 μm on the recording medium using a bar coater with maintaining the temperature at 30° C., and immediately after the coating, the resulted coating film was dried at 50° C. for 2 seconds.

After that, the inkjet head was placed and fixed in a manner such that the direction (W direction in FIG. 2) of the line along which print nozzles were arrayed was inclined at an angle of 75.7° (90°−α in FIG. 2) with respect to the direction (principal scanning direction: X direction in FIG. 2) perpendicular to the moving direction (sub-scanning direction: Y direction in FIG. 2) of the stage. While the recording medium was moved at a constant speed in the sub-scanning direction, the ink was ejected according to the line system under ejection conditions of an ink droplet amount of 2.4 pL, an ejection frequency of 24 kHz, and a resolution of 1200 dpi×1200 dpi, so that a 50%-solid image having an area of 2 cm-square was printed.

Immediately after the printing, the solid image was dried for 3 seconds at 60° C. and passed through a pair of fixing rolls heated at 60° C. so as to be fixed at a nip pressure of 0.25 MPa and a nip width of 4 mm. A sample for the following evaluations was thus obtained.

(Evaluation of Rub Resistance)

Immediately after forming of the solid image, an unrecorded recording medium (TOKUBISHI ART PAPER DOUBLE-SIDED N, described above) was placed on the solid image of the sample, and was rubbed thereagainst reciprocatingly (back and forth) 10 times with a load of 150 kg/m². Scratch made on the solid image and the degree of transfer of ink to the white blank area of the unrecorded recording medium were visually observed, and were evaluated according to the following evaluation criteria. The result of the evaluation is shown in the following Table 2.

The grade C in the evaluation is deemed as practically problematic.

—Evaluation Criteria—

A: No scratch is observed on the printed solid image. There is no transfer of ink at all.

B: Transfer of ink is hardly noticeable, although scratch is slightly observed on the printed solid image.

C: Transfer of ink and/or scratch on the printed solid image is remarkable.

Evaluation of Discharge Reliability (i) Evaluation of Recoverability after Ejection (Dummy Jet Recoverability)

An inkjet head having a silicone nozzle plate as shown in FIG. 1 was fixed in a manner that the moving direction of a stage became perpendicular to the nozzle alignment direction. Herein, a liquid-repellent film was previously provided on the surface of the silicone nozzle plate by using a fluorinated alkylsilane compound. A reservoir tank connected to the inkjet head was refilled with the ink composition obtained as above. A recording medium (trade name: GASAI SHASHIN SHIAGE PRO, manufactured by Fujifilm Corporation) was fixed onto the stage that was movable in the direction perpendicular to the nozzle alignment direction.

The stage was then moved at a speed of 248 mm/minute under ejection conditions of an ink droplet amount of 3.4 pL, an ejection frequency of 10 kHz, a resolution of 75 dpi×1200 dpi (nozzle alignment direction×moving direction), and a number of ink droplets ejected from each nozzle of 2000, so that a sample having an image of 96 lines which were parallel to the moving direction was formed. The thus-obtained printed sample was visually observed to confirm that every nozzle ejected the ink.

The inkjet head was left stand as it was after the ink ejection for a certain period. Then, an unprinted recording medium is fixed onto the stage, and another printed sample was formed by discharging the ink composition under the same ejection conditions. The thus-obtained another printed sample was visually observed. The discharge reliability of the ink composition was evaluated in terms of the length of the maximum left-standing period which allowed ejection of the 2000 droplets of the ink for all of the 96 nozzles. The longer maximum left-standing period, during which discharge failure does not occur, means the better discharge reliability of the ink composition. The dummy jet recoverability was evaluated according to the following evaluation criteria.

The grade D in the evaluation is deemed as practically problematic.

—Evaluation Criteria—:

A: The maximum left-standing period during which discharge failure does not occur is 45 minutes or more.

B: The maximum left-standing period during which discharge failure does not occur is 30 minutes or more but less than 45 minutes.

C: The maximum left-standing period during which discharge failure does not occur is 20 minutes or more but less than 30 minutes.

D: The maximum left-standing period during which discharge failure does not occur is less than 20 minutes.

(ii) Evaluation of Responding Property for Ejection (Latency)

An inkjet head having a silicone nozzle plate as shown in FIG. 1 was fixed in a manner that the moving direction of a stage became perpendicular to the nozzle alignment direction. Herein, a liquid-repellent film was previously provided on the surface of the silicone nozzle plate by using a fluorinated alkylsilane compound. A reservoir tank connected to the inkjet head was refilled with the ink composition obtained as above. A recording medium (trade name: GASAI SHASHIN SHIAGE PRO, described above) was fixed onto the stage that was movable in the direction perpendicular to the nozzle alignment direction.

The stage was then moved at a speed of 248 mm/minute under ejection conditions of an ink droplet amount of 3.4 pL, an ejection frequency of 20 kHz, a resolution of 75 dpi×1200 dpi (nozzle alignment direction×moving direction), and a number of ink droplets ejected from each nozzle of 2000, so that a sample having an image of 96 lines which were parallel to the moving direction was formed. The thus-obtained printed sample was visually observed to confirm that every nozzle ejected the ink.

The inkjet head was left stand as it was after the ink ejection for one minute. Then, an unprinted recording medium is fixed onto the stage, and another printed sample was formed by discharging the ink composition under the same ejection conditions. An ink dot formed by a first-ejected ink droplet on the thus-obtained another printed sample was visually observed by using a microscope of 50 times power. The latency of the ink composition was evaluated according to the following evaluation criteria.

The grade C in the evaluation is deemed as practically problematic.

Evaluation Criteria:

A: Every nozzle is capable to eject the ink composition properly.

B: Every nozzle is capable to eject the ink composition, although there is a nozzle which delays ejection from 10 μm to 30 μm behind from the proper ejection position with respect to the moving direction.

C: A nozzle which fails to eject the ink composition or a nozzle which delays ejection at least 30 μm behind from the proper ejection position with respect to the moving direction is observed.

(Evaluation of Liquid-Repellency)

—Immersing Test for Liquid-Repellent Film—

A test piece was prepared by applying a fluorinated alkylsilane compound onto a silicone plate having a size of 2 cm×2 cm to form a liquid-repellant film (self assembled monolayer (SAM)). The contact angle of water with respect to the liquid-repellant film was measured in accordance with the following procedure, and the effect of the ink composition to the liquid-repellency of the liquid-repellant film was evaluated.

30 mL of the respective ink composition was placed in a 50 mL-jar made of polypropylene (trade name: AIBOY HIROKUCHI BIN 50 mL, manufactured by Asone Corporation). The test piece was then immersed in the ink composition and maintained at 60° C. for 72 hours. The test piece was then taken out from the jar, washed with ultrapure water, and subjected measurement of the contact angle of water with respect to the liquid-repellant film.

The measurement of the contact angle was performed by using ultrapure water and a contact angle measurement apparatus (trade name: DM-500, manufactured by Kyowa Interface Science Co., Ltd.) under the environment condition of 25° C. at 50% relative humidity, and evaluation was performed according to the following evaluation criteria.

The contact angle of water with respect to the liquid-repellant film observed before performing the immersion test was 106.5°. The grade D in the evaluation is deemed as practically problematic.

—Evaluation Criteria—:

AA: The contact angle is 80° or more.

A: The contact angle is 60° or more but less than 80°.

B: The contact angle is 40° or more but less than 60°.

C: The contact angle is 20° or more but less than 40°.

D: The contact angle is less than 20°.

TABLE 2

| Ink com-position | Discharge reliability | | Rub resistance | Liquid repellency | Remarks |
| --- | --- | --- | --- | --- | --- |
| | Dummy jet recoverability | Latency | | | |
| M-1 | C | B | B | A | Present invention |
| M-2 | B | B | A | A | Present invention |
| M-3 | A | A | A | B | Present invention |
| M-4 | A | A | A | C | Present invention |
| M-5 | A | A | A | A | Present invention |
| M-6 | A | B | A | C | Present invention |
| M-7 | B | B | B | B | Present invention |
| M-8 | B | A | A | B | Present invention |
| M-9 | B | A | A | D | Comparative Example |

TABLE 2-continued

| Ink composition | Discharge reliability | | | | Remarks |
|---|---|---|---|---|---|
| | Dummy jet recoverability | Latency | Rub resistance | Liquid repellency | |
| M-10 | A | A | A | D | Comparative Example |
| M-11 | D | C | C | B | Comparative Example |

The results shown in Table 2 indicate that the ink compositions of these embodiments have excellent ink jetting reliability and provide images having excellent rub resistance. It is further understood that the ink compositions of these embodiments can suppress deterioration of liquid-repellency of inkjet head units.

The invention may provide an ink composition having excellent ink discharge reliability, providing excellent rub resistance to images formed therewith, and suppressing deterioration of the liquid-repellency of inkjet head units. The invention may further provide an ink set that includes the ink composition, and an inkjet image recording method using the ink composition.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. An inkjet image forming method, comprising discharging an inkjet ink composition from an inkjet head equipped with a silicon nozzle plate, onto a medium, the inkjet ink composition comprising a pigment and colloidal silica, the pigment being covered with a water-insoluble resin comprising a constituent unit having an acidic group, and a content of the colloidal silica being in a range of from 0.01% by mass to less than 0.1% by mass with respect to a total mass of the inkjet ink composition.

2. The inkjet image forming method according to claim 1, wherein an acid value of the water-insoluble resin is in a range of 30 mgKOH/g to 100 mgKOH/g.

3. The inkjet image forming method according to claim 1, wherein the water-insoluble resin comprises a hydrophilic constituent unit derived from a (meth)acrylic acid monomer and a hydrophobic constituent unit having an aromatic ring.

4. The inkjet image forming method according to claim 3, wherein the hydrophobic constituent unit comprises at least one constituent unit represented by the following Formula (1):

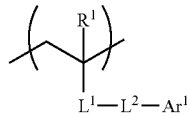

Formula (1)

wherein, in Formula (1), $R^1$ represents a hydrogen atom or a methyl group; $L^1$ represents an unsubstituted or substituted phenylene group; $L^2$ represents a single bond or a divalent linking group; and $Ar^1$ represents a monovalent group derived from a condensed aromatic ring having 8 or more carbon atoms, a heterocycle having an aromatic ring condensed therein, or a compound having two or more benzene rings linked to each other.

5. The inkjet image forming method according to claim 3, wherein the hydrophobic constituent unit comprises at least one constituent unit represented by the following Formula (2):

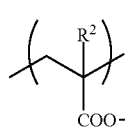

Formula (2)

wherein, in Formula (2), $R^2$ represents a hydrogen atom or a methyl group, and $Ar^2$ represents a monovalent group derived from an unsubstituted or substituted aromatic ring.

6. The inkjet image forming method according to claim 5, wherein, in Formula (2), $Ar^2$ represents a monovalent group derived from a condensed aromatic ring having 8 or more carbon atoms, a heterocycle having (an) aromatic ring(s) condensed therein, or a compound having two or more benzene rings linked to each other.

7. The inkjet image forming method according to claim 1, further comprising a first hydrophilic organic solvent having an I/O value in a range of 0.70 or more but less than 1.00.

8. The inkjet image forming method according to claim 7, further comprising a second hydrophilic organic solvent having an I/O value in a range from 1.00 to 1.50.

9. The inkjet image forming method according to claim 1 having a pH value in a range from 7.5 to 10 at a temperature of 25° C.

10. The inkjet image forming method according to claim 1, wherein the pigment is pigment covered with the water-insoluble resin by using a phase inversion method.

11. The inkjet image forming method according to claim 1, wherein a volume average particle diameter of the colloidal silica is 25 nm or less.

12. The inkjet image forming method according to claim 1, wherein the content ratio of the colloidal silica to the water-insoluble resin (colloidal silica/water-insoluble resin) in the inkjet ink composition is from 0.0001 to 0.5 on the basis of mass.

13. An ink set, comprising at least one of an inkjet ink composition and at least one treatment liquid configured to form aggregates when contacted with the inkjet ink composition, the inkjet ink composition comprising a pigment and colloidal silica, the pigment being covered with a water-insoluble resin comprising a constituent unit having an acidic group, and a content of the colloidal silica being in a range of from 0.01% by mass to less than 0.1% by mass with respect to a total mass of the inkjet ink composition.

14. The inkjet image forming method of claim 1, further comprising applying a treatment liquid which is capable of forming an aggregate when contacted with the inkjet ink composition, on the recording medium.

15. The ink set according to claim 13, wherein an acid value of the water-insoluble resin is in a range of from 30 mgKOH/g to 100 mgKOH/g.

16. The ink set according to claim 13, wherein the water-insoluble resin comprises a hydrophilic constituent unit derived from a (meth)acrylic acid monomer and a hydrophobic constituent unit having an aromatic ring.

17. The ink set according to claim 16, wherein the hydrophobic constituent unit comprises at least one constituent unit represented by the following Formula (1):

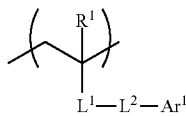

Formula (1)

wherein, in Formula (1), $R^1$ represents a hydrogen atom or a methyl group; $L^1$ represents an unsubstituted or substituted phenylene group; $L^2$ represents a single bond or a divalent linking group; and $Ar^1$ represents a monovalent group derived from a condensed aromatic ring having 8 or more carbon atoms, a heterocycle having an aromatic ring condensed therein, or a compound having two or more benzene rings linked to each other.

18. The ink set according to claim 16, wherein the hydrophobic constituent unit comprises at least one constituent unit represented by the following Formula (2):

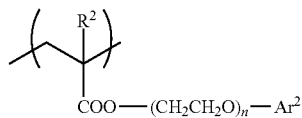

Formula (2)

wherein, in Formula (2), $R^2$ represents a hydrogen atom or a methyl group, and $Ar^2$ represents a monovalent group derived from an unsubstituted or substituted aromatic ring.

19. The ink set according to claim 18, wherein, in Formula (2), $Ar^2$ represents a monovalent group derived from a condensed aromatic ring having 8 or more carbon atoms, a heterocycle having (an) aromatic ring(s) condensed therein, or a compound having two or more benzene rings linked to each other.

20. The ink set according to claim 13, wherein the inkjet ink composition further comprises a first hydrophilic organic solvent having an I/O value in a range of 0.70 or more but less than 1.00.

21. The ink set according to claim 20, wherein the inkjet ink composition further comprises a second hydrophilic organic solvent having an I/O value in a range from 1.00 to 1.50.

22. The ink set according to claim 13, wherein the inkjet ink composition has a pH value in a range from 7.5 to 10 at a temperature of 25° C.

23. The ink set according to claim 13, wherein the pigment is pigment covered with the water-insoluble resin by using a phase inversion method.

24. The ink set according to claim 13, wherein a volume average particle diameter of the colloidal silica is 25 nm or less.

25. The ink set according to claim 13, wherein the content ratio of the colloidal silica to the water-insoluble resin (colloidal silica/water-insoluble resin) in the inkjet ink composition is from 0.0001 to 0.5 on the basis of mass.

* * * * *